US011462948B2

United States Patent
Park et al.

(10) Patent No.: US 11,462,948 B2
(45) Date of Patent: Oct. 4, 2022

(54) WIRELESS POWER TRANSMISSION APPARATUS AND CONTROL METHOD THEREOF

(71) Applicant: SAMSUNG ELECTRONICS CO., LTD., Suwon-si (KR)

(72) Inventors: Jae-Seok Park, Yongin-si (KR); Chong-Min Lee, Seoul (KR); Sung-Ku Yeo, Seoul (KR); Jae-Hyuck Shin, Suwon-si (KR); Young-Ho Ryu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 16/753,406

(22) PCT Filed: Oct. 19, 2018

(86) PCT No.: PCT/KR2018/012386
§ 371 (c)(1),
(2) Date: Apr. 3, 2020

(87) PCT Pub. No.: WO2019/078660
PCT Pub. Date: Apr. 25, 2019

(65) Prior Publication Data
US 2021/0376664 A1 Dec. 2, 2021

(30) Foreign Application Priority Data
Oct. 20, 2017 (KR) .......................... 10-2017-0136860

(51) Int. Cl.
*H02J 50/60* (2016.01)
*H02J 50/23* (2016.01)
(Continued)

(52) U.S. Cl.
CPC ........... *H02J 50/23* (2016.02); *H01Q 9/0407* (2013.01); *H02J 50/60* (2016.02); *H04B 5/0037* (2013.01); *H04B 7/0617* (2013.01)

(58) Field of Classification Search
CPC .. H01Q 9/0407; H04B 7/0617; H04B 5/0037; H02J 50/20; H02J 50/23; H02J 50/40;
(Continued)

(56) References Cited

U.S. PATENT DOCUMENTS 10,333,357 B1 * 6/2019 Abu Qahouq .......... H02J 50/20
2015/0076917 A1 3/2015 Leabman et al.
(Continued)

FOREIGN PATENT DOCUMENTS

EP 3154153 A1 4/2017
KR 10-2017-0033257 A 3/2017
(Continued)

OTHER PUBLICATIONS

International Search Report dated Jan. 25, 2019 issued by the International Searching Authority in counterpart International Application No. PCT/KR2018/012386 (PCT/ISA/210).
(Continued)

*Primary Examiner* — Levi Gannon
(74) *Attorney, Agent, or Firm* — Sughrue Mion, PLLC

(57) ABSTRACT

A wireless power transmission apparatus includes patch antennas which form an RF wave; a memory storing electromagnetic wave distribution maps corresponding to transmission conditions for transmitting the RF wave; and a processor configured to determine a position of an electronic device and a position of a living body, determine a transmission condition which transmits the RF wave which causes an electromagnetic wave having a size not exceeding a first threshold value to be applied to a position of the living body while being beam-formed at a position of the elec-
(Continued)

tronic device, using at least a portion of the electromagnetic wave distribution maps, and generate the RF wave with the determined transmission condition using the patch antennas, each electromagnetic wave distribution map indicating the size of electromagnetic waves at one or more points around the wireless power transmission apparatus when the RF wave is formed by each of the transmission conditions.

14 Claims, 32 Drawing Sheets

(51) Int. Cl.
*H01Q 9/04* (2006.01)
*H04B 5/00* (2006.01)
*H04B 7/06* (2006.01)

(58) Field of Classification Search
CPC .......... H02J 50/402; H02J 50/60; H02J 50/80; H02J 50/90
See application file for complete search history.

(56) References Cited

U.S. PATENT DOCUMENTS

| | | | |
|---|---|---|---|
| 2015/0236515 A1* | 8/2015 | Yoshida | H02J 7/025 307/104 |
| 2015/0318729 A1 | 11/2015 | Leabman | |
| 2015/0340875 A1* | 11/2015 | Prasad | G06F 1/3203 307/104 |
| 2015/0355359 A1 | 12/2015 | Miyashita | |
| 2016/0299210 A1 | 10/2016 | Zeine | |
| 2017/0005530 A1 | 1/2017 | Zeine et al. | |
| 2017/0077736 A1 | 3/2017 | Leabman | |
| 2017/0085120 A1 | 3/2017 | Leabman et al. | |
| 2017/0110888 A1* | 4/2017 | Leabman | H02J 50/90 |
| 2017/0192486 A1* | 7/2017 | Park | G06F 1/3231 |
| 2018/0069438 A1* | 3/2018 | Bit-Babik | H02J 50/20 |
| 2020/0136435 A1* | 4/2020 | Mitomo | H02J 50/12 |
| 2020/0403453 A1* | 12/2020 | Sherman | H04B 7/0617 |

FOREIGN PATENT DOCUMENTS

| | | |
|---|---|---|
| KR | 10-1766435 B1 | 8/2017 |
| KR | 10-2017-0112899 A | 10/2017 |
| WO | 2017/004352 A1 | 1/2017 |
| WO | 2017117452 A1 | 7/2017 |
| WO | 2017/137838 A1 | 8/2017 |

OTHER PUBLICATIONS

Written Opinion dated Jan. 25, 2019 issued by the International Searching Authority in counterpart International Application No. PCT/KR2018/012386 (PCT/ISA/237).

Communication dated May 4, 2020, issued by the European Patent Office in counterpart European Application No. 18868198.5.

Communication dated Jun. 17, 2022 issued by Intellectual Property India in Indian Application No. 202017020697.

Communication dated Mar. 18, 2022 by the Korean Intellectual Property Office in Korean Patent Application No. 10-2017-0136860.

* cited by examiner

WIRELESS POWER TRANSMISSION APPARATUS AND CONTROL METHOD THEREOF

CROSS-REFERENCE TO RELATED APPLICATION(S)

This application is a National Phase Entry of PCT International Application No. PCT/KR2018/012386, which was filed on Oct. 19, 2018 and claims priority to Korean Patent Application No. 10-2017-0136860, which was filed on Oct. 20, 2017, the contents of which are incorporated herein by reference.

BACKGROUND

1. Field

Various embodiments relate to a wireless power transmission apparatus and a control method thereof, and more particularly, to a wireless power transmission apparatus capable of wirelessly transmitting power to an electronic device and a method of controlling the same.

2. Description of the Related Art

For many people in modern times, portable digital communication devices have become essential items. Consumers want to be provided with various high-quality services they want regardless of time or place. In addition, due to the recent development of IoT (Internet of Things) technology, various sensors, home appliances, communication devices, etc. existing in our lives are being united via networking. In order to smoothly operate these various sensors, a wireless power transmission system is required.

Wireless power transmission methods include a magnetic induction method, a magnetic resonance method, and an electromagnetic-wave method, of which the electromagnetic-wave method is advantageous for remote power transmission compared with the other methods.

SUMMARY

An electromagnetic-wave-type wireless power transmission apparatus may determine the position of a charging target, for example, an electronic device, and may then form radio-frequency (RF) waves toward the corresponding position. The wireless power transmission apparatus may form RF waves having a relatively high frequency (e.g., 5.8 GHz). In addition, the wireless power transmission apparatus may form RF waves having a relatively large magnitude for remote charging. When a living body such as a person or an animal is located around the wireless power transmission apparatus, RIF waves may be applied to the living body. RF waves may be harmful to living bodies.

Various embodiments may provide a wireless power transmission apparatus capable of determining whether RF waves having a large magnitude are applied to a living body using a stored electromagnetic distribution map before forming RF waves, and a method of operating the wireless power transmission apparatus. There may be provided a wireless power transmission apparatus capable of preventing harmful electromagnetic waves from being exposed to a living body by reducing the magnitude of RF waves or by changing the path of RF waves when the living body is expected to be exposed to electromagnetic waves having a relatively large magnitude, and a method of operating the wireless power transmission apparatus.

According to various embodiments, a wireless power transmission apparatus may include: a plurality of patch antennas configured to form radio-frequency (RF) waves; memory configured to store a plurality of electromagnetic-wave distribution maps, which respectively correspond to a plurality of transmission conditions for transmitting the RF waves; and a processor. The processor may be configured to: determine the position of an electronic device and the position of a living body; determine a transmission condition for transmitting the RF waves, which causes an electromagnetic wave having a magnitude that does not exceed a first threshold to be applied to the position of the living body while being beam-formed at the position of the electronic device, using at least some of the plurality of electromagnetic-wave distribution maps; and generate the RF waves under the determined transmission condition using the plurality of patch antennas. Each of the plurality of electromagnetic-wave distribution maps may represent the magnitude of an electromagnetic wave at at least one point around the wireless power transmission apparatus in the case in which the RF waves are formed according to each of the plurality of transmission conditions.

According to various embodiments, a method of operating a wireless power transmission apparatus including a plurality of patch antennas forming radio-frequency (RF) waves may include: an operation of determining the position of an electronic device and the position of a living body; an operation of determining a transmission condition for transmitting the RF waves, which causes an electromagnetic wave having a magnitude that does not exceed a first threshold to be applied to the position of the living body using at least some of the plurality of electromagnetic-wave distribution maps, which respectively correspond to a plurality of transmission conditions for transmitting the RF waves; and an operation of generating the RF waves under the determined transmission condition using the plurality of patch antennas. Each of the plurality of electromagnetic-wave distribution maps may represent the magnitude of an electromagnetic wave at at least one point around the wireless power transmission apparatus in the case in which the RF waves are formed according to each of the plurality of transmission conditions.

According to various embodiments, a wireless power transmission apparatus may include: a plurality of patch antennas configured to form radio-frequency (RF) waves; a plurality of antennas configured to form transmission waves for detecting an object and to receive reflected waves formed by the reflection of the transmission waves; a signal generation circuit configured to generate electrical signals provided to the plurality of patch antennas and the plurality of antennas; a first filter configured to filter components of a first frequency band from the electrical signals and to provide the same to the plurality of patch antennas; a second filter configured to filter components of a second frequency band from the electrical signals and to provide the same to the plurality of antennas; and a processor. The processor may be configured to: analyze the reflected waves received through the plurality of antennas so as to determine the position of an object; and perform control such that, when the object is determined to be an electronic device, the RF waves are generated at the determined position using the plurality of patch antennas.

According to various embodiments, it is possible to provide a wireless power transmission apparatus capable of determining an RF wave transmission condition using an electromagnetic-wave distribution map and a method of operating the same. Accordingly, since RF waves having a relatively large magnitude may not be applied to a living body, it is possible to protect the user.

DETAILED DESCRIPTION

Figure 1:
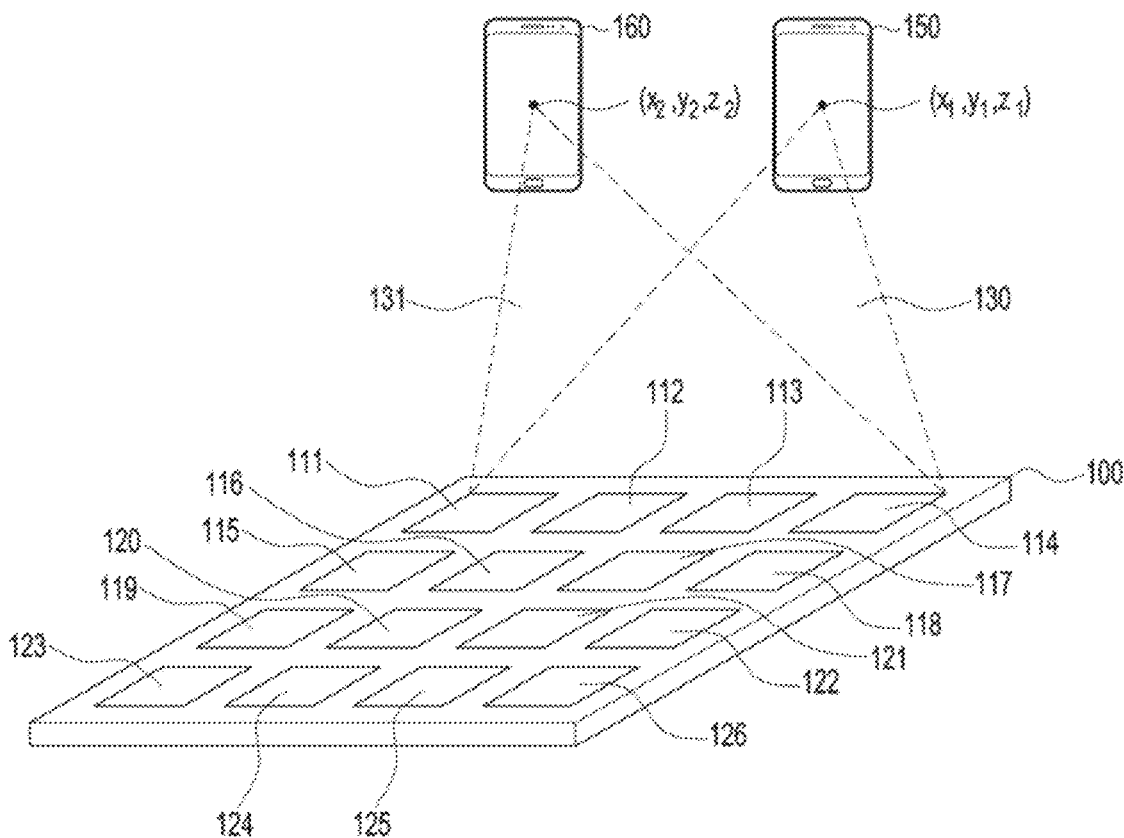
FIG. 1 is a conceptual view of a wireless power transmission system according to various embodiments of the disclosure.

Hereinafter, various embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively)

connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to". "adapted to", "made to", "capable of", or "designed to" in terms of hardware or software, according to circumstances. Alternatively, in some situations, the expression "device configured to" may mean that the device, together with other devices or components, "is able to". For example, the phrase "processor adapted (or configured) to perform A. B. and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or mom software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, a wireless power transmission apparatus or an electronic device may include at least one of, for example, a television, a Digital Video Disk (DVD) player, an audio set, a refrigerator, an air conditioner, a cleaner, an oven, a microwave oven, a washing machine, an air purifier, a set-top box, a home automation control panel, a security control panel, a media box, a game console, an electronic dictionary, an electronic key, a camcorder, or an electronic picture frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the wireless power transmission apparatus or the electronic device may be flexible, or may be a combination of two or more of various devices described above. The wireless power transmission apparatus or the electronic device according to an embodiment disclosed herein is not limited to the above-described devices. Herein, the term "user" may refer to a person who uses an electronic device or a device that uses a wireless power transmission apparatus or an electronic device (e.g., an artificial intelligence electronic device).

FIG. 1 is a conceptual view of a wireless power transmission system according to various embodiments of the disclosure.

A wireless power transmission apparatus 100 may wirelessly transmit power to at least one electronic device 150 or 160. Herein, when the wireless power transmission apparatus 100 or the electronic device 150 performs a specific operation, it may mean that, for example, a processor included in the wireless power transmission apparatus 100 or the electronic device 150 performs the specific operation or controls other hardware to perform the specific operation. Alternatively, when the wireless power transmission apparatus 100 or the electronic device 150 performs a specific operation, it may mean that, for example, a processor performs the specific operation or controls other hardware to perform the specific operation as at least one command stored in memory included in the wireless power transmission apparatus 100 or the electronic device 150. In various embodiments, the wireless power transmission apparatus 100 may include a plurality of patch antennas 111 to 126. The patch antennas 111 to 126 are not limited, as long as each of the patch antennas is an antenna capable of generating RF waves. At least one of the amplitude and the phase of each of the RF waves generated by the patch antennas 111 to 126 may be adjusted by the wireless power transmission apparatus 100. For convenience of description, the RF waves generated by each of the patch antennas 111 to 126 will be referred to as sub RF waves.

In various embodiments of the disclosure, the wireless power transmission apparatus 100 may adjust at least one of the amplitude and the phase of each of the sub RF waves generated by the patch antennas 111 to 126. Meanwhile, the sub RF waves may interfere with each other. For example, the sub RF waves may constructively interfere with each other at one point, and may destructively interfere with each other at another point. The wireless power transmission apparatus 100 according to various embodiments of the disclosure may adjust at least one of the amplitude and the phase of each of the sub RF waves generated by the patch antennas 111 to 126 such that the sub RF waves constructively interfere with each other at a first point (x1, y1, z1).

For example, the wireless power transmission apparatus 100 may determine that an electronic device 150 is disposed at the first point (x1, y1, z1). Here, the position of the electronic device 150 may be, for example, the point at which a power reception antenna of the electronic device 150 is located. The configuration that enables the wireless power transmission apparatus 100 to determine the position of the electronic device 150 will be described later in more detail. In order for the electronic device 150 to wirelessly receive power with high efficiency, it is necessary for the sub RF waves to constructively interfere with each other at the first point (x1, y1, z1). Accordingly, the wireless power transmission apparatus 100 may control the patch antennas 111 to 126 such that the sub RF waves constructively interfere with each other at the first point (x1, y1, z1). Here, controlling the patch antennas 111 to 126 may mean controlling the magnitude of a signal input to the patch antennas 111 to 126 or controlling the phase (or delay) of a signal input to the patch antennas 111 to 126. Meanwhile, a person ordinarily skilled in the art may readily understand beamforming, which is a technique for controlling RF waves to constructively interfere with each other at a specific point. In addition, a person ordinarily skilled in the art may also easily understand that there is no limitation on the type of beamforming used in this disclosure. Various beamforming methods disclosed in, for example, US Patent Application Publication No. 2016/0099611, US Patent Application Publication No. 2016/0099755, and US Patent Application Publication No. 2016/0100124 may be used. The form of an RF wave formed by beam-forming may be referred to as a pocket of energy.

Meanwhile, the wireless power transmission apparatus 100 may determine that an electronic device 160 is disposed at a second point (x2, y2, z2). In order to charge the electronic device 160, the wireless power transmission apparatus 100 may control the patch antennas 111 to 126 such that the sub RF waves constructively interfere with each other at the second point (x2, y2, z2). Accordingly, RF waves 131 formed by the sub RF waves may have a maximum amplitude at the second point (x2, y2, z2), and the electronic device 160 may receive wireless power with high transmission efficiency.

As described above, the wireless power transmission apparatus 100 may determine the positions of the electronic devices 150 and 160, and may cause the sub RF waves to constructively interfere with each other at the determined positions, thereby performing wireless charging with high transmission efficiency. Meanwhile, the wireless power transmission apparatus 100 may be able to perform wireless charging with high transmission efficiency only when the positions of the electronic devices 150 and 160 are accurately determined.

Figure 2:
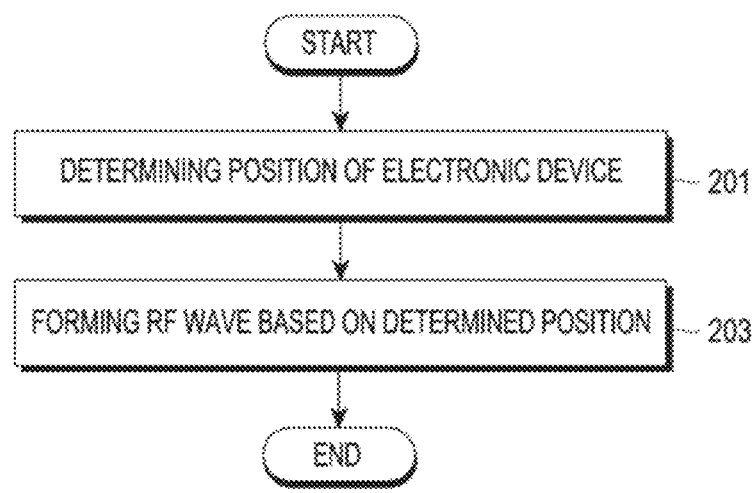
FIG. 2 is a flowchart illustrating a method of operating a wireless power transmission apparatus according to various embodiments.

FIG. 2 is a flowchart illustrating a method of operating a wireless power transmission apparatus according to various embodiments.

According to various embodiments, in operation 201, the wireless power transmission apparatus 100 may determine the locations of electronic devices (e.g., the electronic devices 150 and 160). The wireless power transmission apparatus 100 may determine the position of an electronic device based at least on data input from various sensors. According to an embodiment, the wireless power transmission apparatus 100 may determine the position of an electronic device based at least on a communication signal received by a communication circuit. The wireless power transmission apparatus 100 may include, for example, a communication circuit having a plurality of antennas (e.g., an antenna array). The wireless power transmission apparatus 100 may determine the position of an electronic device using at least one of the reception time of a communication signal at each of the plurality of antennas or the phase of the communication signal. Alternatively, the wireless power transmission apparatus 100 may determine the distance between the wireless power transmission apparatus 100 and the electronic device using the intensity of the communication signal. For example, the communication signal may include information on the transmission intensity thereof, and the wireless power transmission apparatus 100 may compare the transmission intensity of the communication signal and the reception intensity of the communication signal so as to determine the distance between the wireless power transmission apparatus 100 and the electronic device. Alternatively, the wireless power transmission apparatus 100 may determine the distance between the wireless power transmission apparatus 100 and the electronic device using the time of flight (TOF) of the communication signal. For example, the communication signal may include information on the transmission time thereof, and the wireless power transmission apparatus 100 may compare the reception time of the transmission signal and the transmission time of the communication signal so as to determine the distance between the wireless power transmission apparatus 100 and the electronic device.

According to various embodiments, the wireless power transmission apparatus 100 may include a radar-type sensor. The wireless power transmission apparatus 100 may generate a transmission wave through a sensor, and may receive a reflected wave corresponding thereto. For example, an obstacle such as an electronic device or a person's body may be located around the wireless power transmission apparatus 100. The obstacle may be an object that cannot generate power using an RF wave, or may be another electronic device, which is not designated as a charging target. The transmission wave generated from the sensor is reflected by the electronic device or the obstacle, and thus a reflected wave may be formed. By the reflection, at least one of the amplitude or the phase of the transmission wave may be changed, and thus at least one of the amplitude or the phase of the reception wave may be different from at least one of the amplitude or the phase of the transmission wave. The wireless power transmission apparatus 100 may receive a reflected wave through a sensor, and may determine at least one of the amplitude or the phase of the reflected wave. The sensor of the wireless power transmission apparatus 100 may include a plurality of antennas for reception, in which case the reflected wave may be received at each of the plurality of antennas for reception. In various embodiments, an antenna for reception may be used for transmission of a transmission wave, or the wireless power transmission apparatus 100 may include a transmission antenna and a reception antenna that is physically distinct from the transmission antenna. Since the plurality of antennas for reception have physically different positions, at least one of the amplitude of the reception wave, the reception timing of the reception wave, or the phase of the reception wave may be different in each of the plurality of antennas for reception. The wireless power transmission apparatus 100 may detect the position of an object there around by analyzing a pattern of reflected waves. For example, when it is determined that the pattern of reflected waves is changed, the wireless power transmission apparatus 100 may determine that a new object approaches the wireless power transmission apparatus 100. The wireless power transmission apparatus 100 may determine the position of an electronic device based on at least one of an amplitude, a phase, or a reception time of a reception wave received by at least one antenna for reception. The wireless power transmission apparatus 100 may determine the position of an electronic device using various radar-based position measurement methods.

According to various embodiments, the wireless power transmission apparatus 100 may include a sensor capable of acquiring an image (e.g., a camera module). The wireless power transmission apparatus 100 may analyze an acquired image, and may determine the position of at least one of an electronic device or an obstacle based on the analysis result. For example, the wireless power transmission apparatus 100 may acquire at least one image related to at least one direction therearound. The wireless power transmission apparatus 100 may acquire a plurality of frame images in succession, and may detect a change between the frame images. For example, the wireless power transmission apparatus 100 may determine that an object that has not been detected in the first frame image is included in the second frame image, and thus may determine that, at the time point corresponding to the second frame image, a subject corresponding to the object is located near the wireless power transmission apparatus 100. The wireless power transmission apparatus 100 may determine the position of the subject near the wireless power transmission apparatus 100 based on at least one of the position or the size of the object in the image. For example, the wireless power transmission apparatus 100 may determine the position of the subject based on at least one of the position or the capture direction of the camera that captures the image and at least one of the position or the size of the subject in the captured image. The wireless power transmission apparatus 100 may determine whether a newly detected object is a chargeable electronic device or a person's body by applying various recognition algorithms to the image. The wireless power transmission apparatus 100 may determine the position of the electronic device using various types of sensors, or may receive information about the position of the electronic device from another position measurement device.

In operation 203, the wireless power transmission apparatus 100 may form an RF wave based on the determined position. The wireless power transmission apparatus 100 may control at least one of the phase or the amplitude of each of the electrical signals input to each of the patch antennas such that sub RF waves constructively interfere with each other at the determined position. The wireless power transmission apparatus 100 may control at least one of the phase or the amplitude of each of the electrical signals input to each of the patch antennas by controlling at least one of a phase shifter or an amplifier connected to each of the patch antennas.

According to various embodiments, the wireless power transmission apparatus 100 may control at least one of the phase or the amplitude of an electrical signal input to each of the patch antennas using associated information between spatial coordinates and the phase or the amplitude of the electrical signal previously stored therein. For example, the plurality of patch antennas 111 to 126 of the wireless power transmission apparatus 100 may be arranged in an M×N (e.g., 4×4) grid. The wireless power transmission apparatus 100 may divide the surrounding space into, for example, P×Q×R subspaces, and may allocate spatial coordinates (e.g., coordinates (i, j, k) (i is a natural number of 1 or more and P or less, j is a natural number of 1 or more and Q or less, and k is a natural number of 1 or more and R or less)) to each of the subspaces. For beamforming at, for example, the point (i, j, k), the wireless power transmission apparatus 100 may store in advance associated information indicating that the phase control degree of a patch antenna Ta,b among the plurality of patch antennas is $\Phi_{a,b}$ and that the amplitude magnitude is $A_{a,b}$. Here, "a" may be a natural number of 1 or more and less than or equal to M, "b" may be a natural number of 1 or more and less than or equal to N, and "Ta.b" is an indication code indicating a patch antenna, and may mean a patch antenna located at a position (a, b) in the array of a plurality of (M×N) patch antennas. "$\Phi_{a,b}$" represents the degree of phase adjustment of an electrical signal input to Ta,b, and $A_{a,b}$ represents the amplitude information of the electrical signal input to Ta,b. Accordingly, information on the phase control degree corresponding to each of the plurality of (M×N) patch antennas and the amplitude magnitude corresponding to each of the plurality of (M×N) patch antennas may be stored to be associated with the spatial coordinates (i, j, k). By using at least one piece of associated information of a phase control degree or amplitude of an electrical signal input to each of a plurality of patch antennas corresponding to the position of the electronic device 150 identified through various types of sensors, the wireless power transmission apparatus 100 may quickly identify the transmission conditions of an RF wave. For example, the wireless power transmission apparatus 100 may use position information identified through a sensor as spatial coordinates defined in previously stored associated information. For example, the wireless power transmission apparatus 100 may determine the position of the electronic device 150 in an (i, j, k) coordinate format through a radar-type sensor, and may form an RF wave under transmission conditions of $\Phi_{a,b}$, $A_{a,b}$ stored to be associated therewith.

According to various embodiments, the wireless power transmission apparatus 100 may form an RF wave using an electromagnetic-wave distribution map. The wireless power transmission apparatus 100 may primarily determine transmission conditions for an RF wave using the position of an electronic device. The wireless power transmission apparatus 100 may identify the electromagnetic-wave distribution map corresponding to the transmission conditions. When the wireless power transmission apparatus 100 forms an RF wave under specific transmission conditions (e.g., at least one of a phase delay degree or an amplitude for each of the electrical signals input to each of the patch antennas), the electromagnetic-wave distribution map may be a map indicating the magnitude of an electromagnetic wave formed at each point around the wireless power transmission apparatus 100. For example, the electromagnetic-wave distribution map may include information on the magnitude of an electromagnetic wave in each of a plurality of spatial coordinates. The electromagnetic-wave distribution map may be formed according to a simulation result, or may be generated through a test. For example, the wireless power transmission apparatus 100 may store at least one electromagnetic-wave distribution map corresponding to each of a plurality of RF wave transmission conditions in advance, and may read the electromagnetic-wave distribution map corresponding to the identified transmission conditions. The wireless power transmission apparatus 100 may update at least a part of the stored electromagnetic distribution map, based on at least one of the position, the reflection/absorption characteristic, or the electromagnetic wave formation information of at least one of a structure or an object of the surrounding environment. Alternatively, when at least one of the position, the reflection/absorption characteristic, or the electromagnetic wave formation information of at least one of a structure or an object of the surrounding environment is identified, the wireless power transmission apparatus 100 may simulate the electromagnetic-wave distribution in the corresponding environment. The wireless power transmission apparatus 100 may request the corresponding simulation from another electronic device (e.g., a server), or may receive an electromagnetic-wave distribution map in response to the request. The wireless power transmission apparatus 100 may determine whether the magnitude of an RF wave at the position of a living body therearound exceeds a threshold using the electromagnetic-wave distribution map. If it is expected that the magnitude of the RF wave does not exceed the threshold, the wireless power transmission apparatus 100 may form an RF wave under the determined transmission conditions. If it is expected that the magnitude of the RF wave exceeds the threshold, the wireless power transmission apparatus 100 may form an RF wave after changing the determined transmission conditions.

For example, the wireless power transmission apparatus 100 may reduce the magnitude of the RF wave compared with a determined condition. For example, the wireless power transmission apparatus 100 may form an RF wave in a path different from a determined path, and for this purpose, the wireless power transmission apparatus 100 may control the phase degree of an electrical signal input to a patch antenna.

Figure 3A:
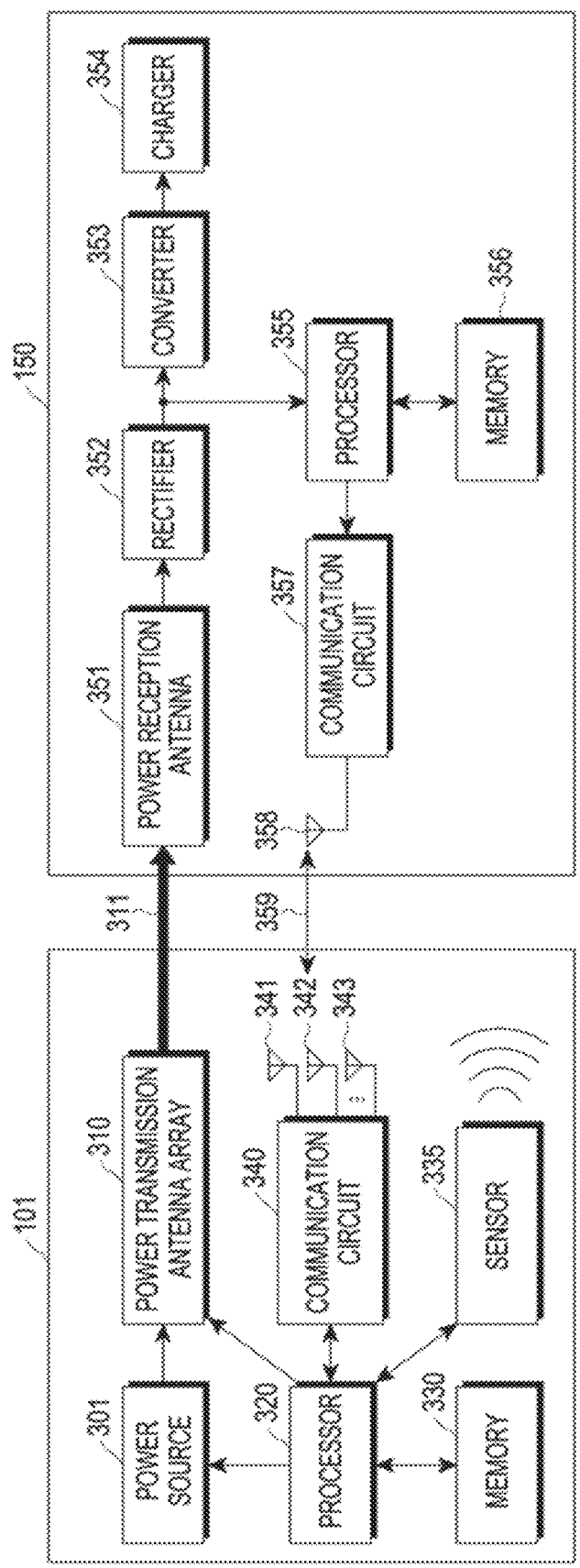
FIG. 3A is a block diagram of a wireless power transmission apparatus according to various embodiments.

FIG. 3A is a block diagram of a wireless power transmission apparatus according to various embodiments.

According to various embodiments, the wireless power transmission apparatus 100 may include a power source 301, a power transmission antenna array 310, a processor 320, a memory 330, a sensor 335, a communication circuit 340, and communication antennas 341 to 343. The electronic device 150 is not limited, as long as it is a device that wirelessly receives power, and may include a power reception antenna 351, a rectifier 352, a converter 353, a charger 354, a processor 355, memory 356, a communication circuit 357, and a communication antenna 358.

The power source 301 may provide power for transmission to the power transmission antenna array 310. The power source 301 may provide, for example, DC power. In this case, an inverter (not illustrated) that converts DC power into AC power and transmits the power to the power transmission antenna array 310 may be further included in the wireless power transmission apparatus 100. Meanwhile, in another embodiment, the power source 301 may provide AC power to the power transmission antenna array 310. In an embodiment, the sensor 335 is of a radar type, and may include an antenna for transmitting a transmission wave. The power transmission antenna array 310 and the sensor 335 may share the power source 301, in which case the power source 301 may form power having a plurality of frequencies. In another embodiment, the wireless power transmission apparatus 100 may include another power source (not illustrated) for providing power to the sensor 335.

The power transmission antenna array 310 may include a plurality of patch antennas. For example, the plurality of patch antennas illustrated in FIG. 1 may be included in the power transmission antenna array 310. There is no restriction on the number or arrangement of patch antennas. The power transmission antenna array 310 may form an RF wave using the power provided from the power source 301. The power transmission antenna array 310 may form an RF wave in a specific direction under the control of the processor 320. Here, forming an RF wave in a specific direction may mean controlling at least one of the amplitude and the phase of the sub RF waves such that the sub RF waves cause constructive interference at at least one point in the specific direction. For example, the processor 320 may control at least one of a phase shifter or an amplifier connected to the power transmission antenna array 310. Meanwhile, the power transmission antenna array 310 is provided for power transmission, and may be referred to as a power transmission antenna.

The processor 320 may determine the position of the electronic device 150 and may perform control such that an RF wave is formed based on the determined position. That is, the processor 320 may control the patch antennas of the power transmission antenna array 310 generating sub RF waves such that the sub RF waves cause constructive interference at the determined position. For example, the processor 320 may control at least one of the amplitude or the phase of a sub RF wave generated from each of the patch antennas by controlling the patch antennas or control means (e.g., at least one of a phase shifter or an amplifier) connected to the patch antennas.

Figure 3B:
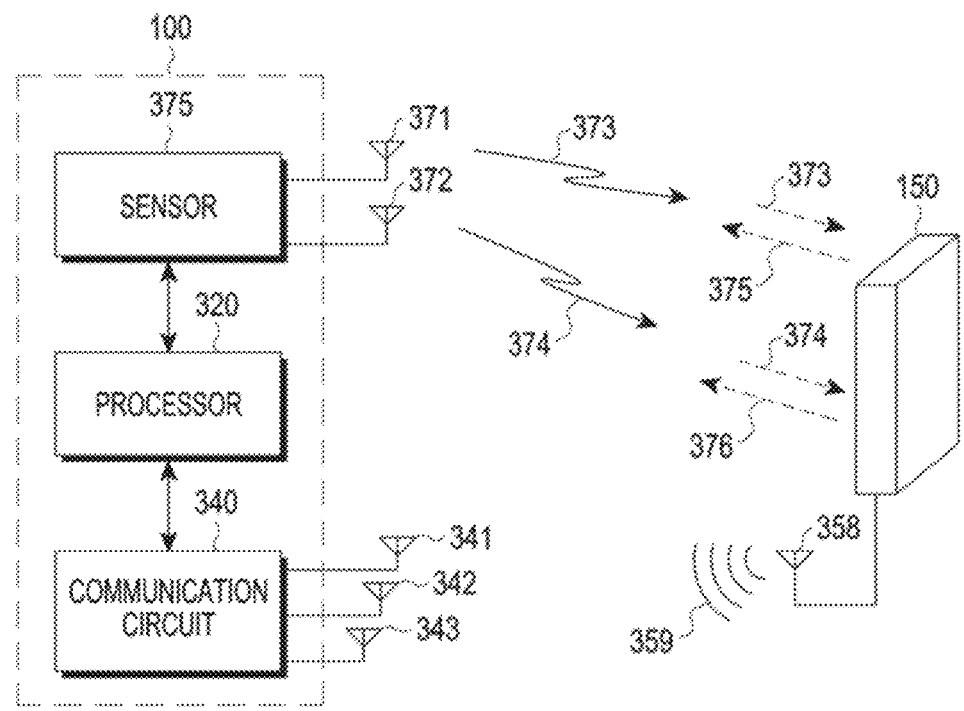
FIG. 3B is a diagram for describing transmission waves and reflected waves according to various embodiments.

In various embodiments, the processor 320 may determine the position of the electronic device 150 based at least on data acquired by the sensor 335. The sensor 335 may be of, for example, a radar type, and may include one or more antennas 371 and 372, as illustrated in FIG. 3B. The processor 320 may control at least some of the one or more antennas 371 and 372 to form transmission waves 373 and 374. For example, the one or more antennas 371 and 372 may form transmission waves 373 and 374 at the same time point or at different time points. Alternatively, among the one or more antennas 371 and 372, only one antenna may form a transmission wave. The transmission waves 373 and 374 may be reflected by an electronic device 150. As a result, the reflected waves 375 and 376 may travel in travel directions different from those of the transmission waves 373 and 374. At least one of the amplitude or the phase of the reflected waves 375 and 376 may be different from at least one of the amplitude or the phase of the transmission waves 373 and 374. The antennas 371 and 372 may convert the reflected waves 375 and 376 into electrical signals and may output the electrical signals to the sensor 335. The sensor 335 may sense at least one piece of information about the phase, the amplitude, or the reception time of each of the reflected waves 375 and 376 in response to an electrical signal output from each of the antennas 371 and 372. The processor 320 may determine the position of the electronic device 150 based at least on at least one of information about the phase, the amplitude, or the reception time of each of the reflected waves 375 and 376. The processor 320 may determine the position of the electronic device 150 using the degree of change of the reflected waves 375 and 376 or through pattern analysis. The processor 320 may determine the position of the electronic device 150 using various conventional radar position measurement methods, and a person ordinarily skilled in the art will understand that there is no limit as to the position measurement methods. In various embodiments, the sensor 335 may determine the position of the electronic device 150, in which case the processor 320 may receive information about the position of the electronic device 150 from the sensor 335.

In various embodiments, the sensor 335 may be a camera capable of forming an image, in which case the processor 320 may determine the position of the electronic device 150 based at least on image analysis. The sensor 335 may be implemented as a device capable of determining the position in various ways, and the type thereof is not limited. In various embodiments, the sensor 335 may include a plurality of devices, for example, a radar and a camera, in which case the wireless power transmission apparatus 100 may determine the position of the electronic device 150 using all of the plurality of position measurement methods. Alternatively, the wireless power transmission apparatus 100 may receive a communication signal 359 from the electronic device 150 through the antennas 341, 342, and 343. The processor 320 may determine the position of the electronic device 150 based on the reception time points of the communication signal 359 at each of the antennas 341, 342, and 343. The processor 320 may determine the position of the electronic device 150 using the data from the sensor 335 and the information acquired through the communication circuit 340 together. For example, at least three communication antennas 341 to 343 may be arranged, and may be used to determine values of θ and Φ in directions corresponding to three dimensions, for example, a spherical coordinate system. More specifically, the communication antenna 358 of the electronic device 150 may transmit a communication signal 359. In various embodiments, the communication signal 359 may include at least one of identification information of the electronic device 150, information required for wireless charging, or at least one piece of sensing information of the electronic device 150. Accordingly, the wireless power transmission apparatus 100 may determine the direction of the electronic device 150 using a communication signal for wireless charging without using additional hardware. Meanwhile, the times at which the communication signal 359 is received by the communication antennas 341 to 343 may be different from each other. The processor 320 of the wireless power transmission apparatus 100 may determine the relative direction of the electronic device 150 with respect to the wireless power transmission apparatus 100 using the times (e.g., t1, t2, and t3) at which the communication signal is received by the communication antennas 341, 342, and 343. For example, the processor 320 may determine the relative direction of the electronic device 150 with respect to the wireless power transmission apparatus 100 using the time difference information of t1-t2, t2-t3, and t3-t1. Alternatively, the processor 320 may determine the relative direction of the electronic device 150 using, for example, a lookup table concerning a relationship between the difference in the reception time for each communication antenna and the direction of the electronic device, in which the lookup table is stored in the memory 330. The wireless power transmission apparatus 100 (or the processor 320) may determine the relative direction of the electronic device 150 in various ways. For example, the relative direction of the electronic device 150 may be determined using various ways, such as a time difference of arrival (TDOA) or a frequency difference of arrival (FDOA), and there is no limitation as to the type of program or algorithm that determines the direction of a received signal. Alternatively, the wireless power transmission apparatus 100 may determine the relative direction of the electronic device 150 based on the phase of the received communication signal.

According to various embodiments, the processor 320 may determine whether the type of the object determined using the sensor 335 is an electronic device depending on whether or not the communication signal 359 is received. When it is determined that the position where the communication signal 359 is formed corresponds to the position determined by the sensor 335, the processor 320 may determine that the object sensed by the sensor 335 is an electronic device ISO. When the position where the communication signal 359 is formed does not correspond to the position determined by the sensor 335 or the communication signal 359 is not received, the processor 320 may determine that the object sensed by the sensor 335 is not an electronic device 150. Alternatively, the processor 320 may determine whether the sensed object is a living body or an electronic device, based at least on the pattern of a reflected wave reflected from the object. Alternatively, the processor 320 may determine whether the object located therearound is a living body or an electronic device based at least on the result of analysis of a captured image.

The processor 320 may control the power transmission antenna array 310 based on the position of the electronic device 150 so as to form an RF wave toward the position of the electronic device 150. In various embodiments, the processor 320 may control at least one of the phase or the amplitude of an electrical signal input to each of the patch antennas of the power transmission antenna array 310 using associated information between spatial coordinates and at least one of the phase or the amplitude of each of a plurality of electrical signals input to each of the patch antennas, in which the associated information has been previously stored in the memory 330. The processor 320 may control at least one of the phase or the amplitude of an electrical signal input to each of the patch antennas of the power transmission antenna array 310 based at least on an electromagnetic-wave distribution map stored in the memory 330. The processor 320 may determine the position of the living body around the wireless power transmission apparatus 100 using the data from the sensor 335. The processor 320 may identify the electromagnetic-wave intensity corresponding to the position of the living body in the electromagnetic-wave distribution map. When the electromagnetic-wave intensity exceeds the threshold, the processor 320 may change a transmission condition. For example, the processor 320 may select an electromagnetic-wave distribution map in which the electromagnetic-wave intensity at the position of the living body is less than or equal to a threshold, and may select a transmission condition corresponding to the electromagnetic-wave distribution map. The processor 320 may perform control to form an RF wave under the selected transmission condition.

The processor 320 may identify the electronic device 150 using the information in the communication signal 359. The communication signal 359 may include a unique identifier or a unique address of the electronic device. The communication circuit 340 may process the communication signal 359 so as to provide information to the processor 320. The communication circuit 340 and the communication antennas 341, 342, and 343 may be manufactured based on various communication schemes, such as wireless fidelity (Wi-Fi), Bluetooth, ZigBee, and Bluetooth Low Energy (BLE), and there is no limitation on the communication schemes. Meanwhile, the communication signal 359 may include rated power information of the electronic device 150, and the processor 320 may determine whether to charge the electronic device 150 based on at least one of the unique identifier, the unique address, and the rated power information of the electronic device 150. The processor 320 may include one or more of a Central Processing Unit (CPU), an Application Processor (AP), and a Communication Processor (CP), and may be implemented as a microcontroller unit, a mini computer, or the like.

In addition, the communication signal 359 may be used in a process in which the wireless power transmission apparatus 100 identifies the electronic device 150, a process in which power transmission is allowed to the electronic device 150, a process in which received power related information is requested from the electronic device 150, and a process in which the received power related information is received from the electronic device 150. That is, the communication signal 359 may be used in a subscription, command, or request process between the wireless power transmission apparatus 100 and the electronic device 150. The communication signal 359 may include information sensed by the electronic device 150 (e.g., motion-sensing information, such as acceleration-sensing information or rotation-sensing information, and information associated with the magnitude of power, such as voltage or current).

Meanwhile, the processor 320 may control the power transmission antenna array 310 to form an RF wave 311 toward the determined position of the electronic device 150. The processor 320 may perform control to form the RF wave 311 toward the position of the electronic device 150 by controlling at least one of the phase shifter or the amplifier included in the power transmission antenna array 310 or connected to the power transmission antenna array 310 outside the power transmission antenna array 310.

The power reception antenna 351 is not limited, as long as it is an antenna capable of receiving an RF wave. In addition, the power reception antenna 351 may also be implemented in the form of an array including a plurality of antennas. AC power received by the power reception antenna 351 may be rectified into DC power by the rectifier 352. The converter 353 may convert the DC power to a required voltage, and may provide the voltage to the charger 354. The charger 354 may charge a battery (not illustrated). Although not illustrated, the converter 353 may provide converted power to a power management integrated circuit (PMIC) (not illustrated), and the PMIC (not illustrated) may provide power to various kinds of hardware of the electronic device 150.

Meanwhile, the processor 355 may monitor the voltage at the output terminal of the rectifier 352. For example, a voltmeter connected to the output terminal of the rectifier 352 may be further included in the electronic device 150, and the processor 355 may receive a voltage value from the voltmeter so as to monitor the voltage at the output terminal of the rectifier 352. The processor 355 may provide the communication circuit 357 with information including the voltage value of the output terminal of the rectifier 352. The charger, the converter, and the PMIC may be implemented in different hardware units, but at least two elements may be implemented in one piece of hardware. Meanwhile, the voltmeter may be implemented in various forms, such as an electrodynamic instrument voltmeter, an electrostatic voltmeter, and a digital voltmeter, but is not limited in type. The communication circuit 357 may transmit a communication signal including the received power related information using the communication antenna 358. The received power related information may be information associated with the magnitude of the received power, such as the voltage at the output terminal of the rectifier 352, and may include the current at the output terminal of the rectifier 352. In this case, it will also be readily understood by a person ordinarily skilled in the art that an ammeter capable of measuring the current at the output terminal of the rectifier 352 may be further included in the electronic device 150. The ammeter may be implemented in various forms, such as a DC current ammeter, an AC current ammeter, and a digital ammeter, and there is no limit as to the type thereof. In addition, the position at which the information related to reception power is measured is not limited to any point on the electronic device 150 or to the output terminal or the input terminal of the rectifier 352. Alternatively, the processor 355 may include various information sensed by the electronic device 150 in the communication signal 359, and may transmit the communication signal 359. In addition, as described above, the processor 355 may transmit the communication signal 359 including identification information of the electronic device 150. The memory 356 may store, for example, a program or an algorithm capable of controlling various kinds of hardware.

Figure 3C:
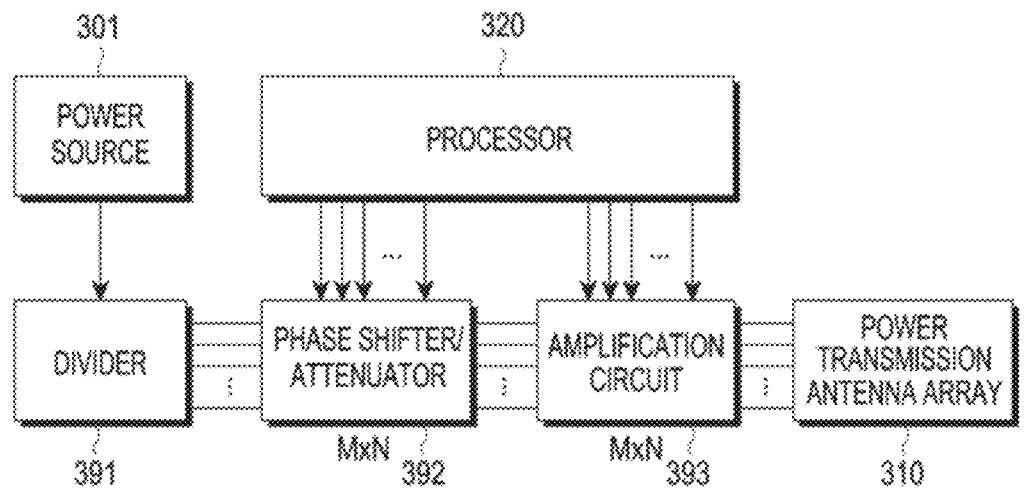
FIG. 3C is a block diagram of a wireless power transmission apparatus according to various embodiments.

FIG. 3C is a block diagram of a wireless power transmission apparatus according to various embodiments.

According to various embodiments, a divider 391 may distribute electrical signals received from the power source 301 into M×N electrical signals and may transmit the M×N electrical signals to M×N phase shifters/attenuators 392. Each of the phase shifters/attenuators 392 may adjust the phase of an input electrical signal or may reduce the amplitude of the electrical signal. M×N amplification circuits 393 may amplify the amplitude of the received electrical signal and input the signal to each of M×N patch antennas of the power transmission antenna array 310. The processor 320 may adjust the beam-forming position by controlling at least one of the shifters/attenuators 392 or the amplification circuits 393.

Figure 4:
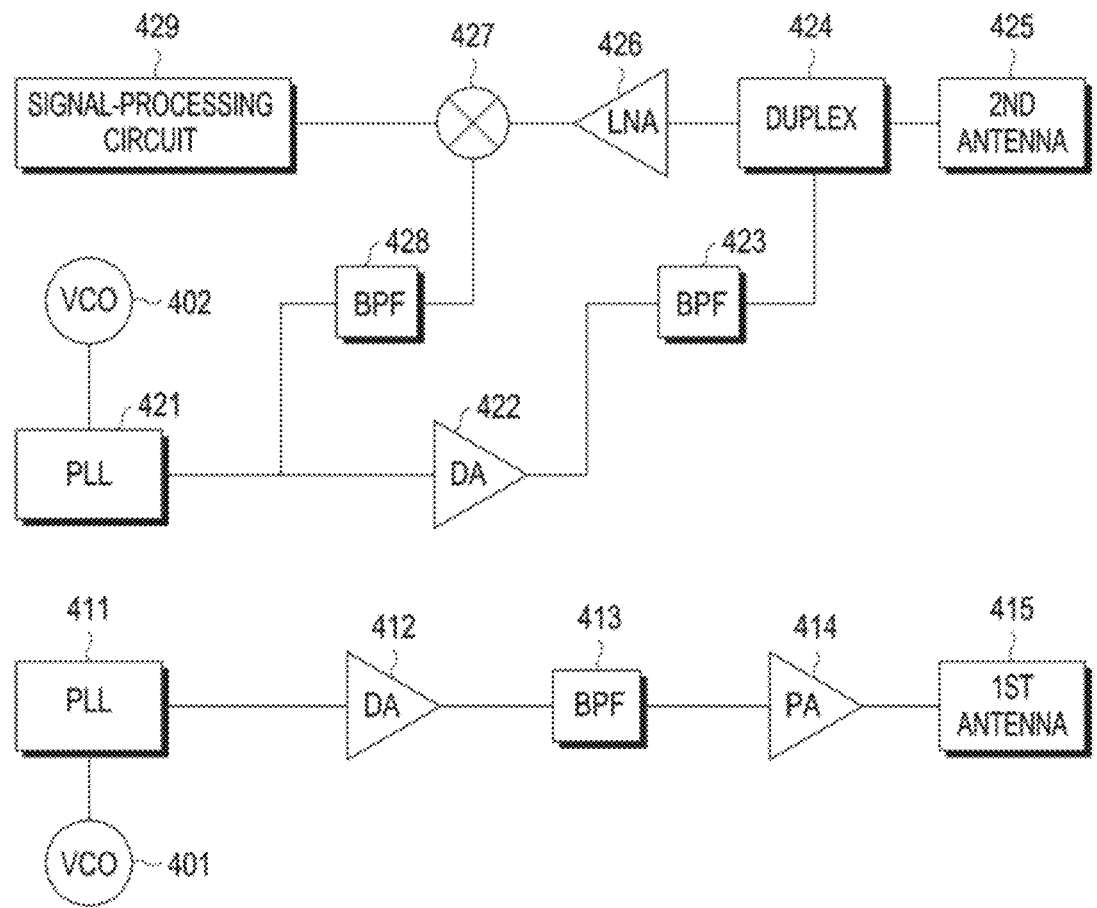
FIG. 4 illustrates a block diagram of a radar-type sensor and an RF-wave-shaping circuit, according to various embodiments.

FIG. 4 illustrates a block diagram of a radar-type sensor and an RF-wave-shaping circuit, according to various embodiments.

Referring to FIG. 4, according to various embodiments, the wireless power transmission apparatus 100 may include a first voltage-controlled oscillator (VCO) 401 and a second VCO 402. The first VCO 401 may form a first electrical signal having a first frequency, and the second VCO 402 may form a second electrical signal having a second frequency that is different from the first frequency. Meanwhile, it will be understood by a person ordinarily skilled in the art that any circuit capable of forming an electrical signal having an AC waveform may replace the first VCO 401 or the second VCO 402. The VCO may be referred to as a signal generation circuit or a power source. A first phase-locked loop (PLL) 411 may output a first electrical signal having a fixed first frequency based on the difference between the phase of the first electrical signal received from the first VCO 401 and the phase of the signal output from the first PLL 411. The first PLL 411 may be included as at least a part of the first VCO 401. The first drive amplifier (DA) 412 may amplify a gain of the first electrical signal and transmit the gain-amplified first electrical signal to the first band-pass filter (BPF) 413. The first BPF 413 may pass a first frequency band. A first power amplifier (PA) 414 may amplify the magnitude of the power of the first electrical signal and may provide the power-amplified first electrical signal to a first antenna 415. The first antenna 415 may include, for example, at least some of the plurality of patch antennas 111 to 126 of FIG. 1, and the first antenna 415 may form an RF wave for charging. The first antenna 415 may include, for example, a divider, a phase shifter, an attenuator, an amplifier circuit, and a power transmission antenna array, as illustrated in FIG. 3C.

A second PLL 421 may output a second electrical signal having a fixed second frequency based on the difference between the phase of the second electrical signal received from the second VCO 402 and the phase of the signal output from the second PLL 421. The second PLL 421 may be included as at least a part of the second VCO 402. A second DA 422 may amplify a gain of the second electrical signal and may transmit the gain-amplified second electrical signal to a second BPF 423. The second BPF 423 may pass a second frequency band. A duplexer 424 may transmit the second electrical signal to a second antenna 425. The second antenna 425 may be, for example, an antenna constituting a radar, and may form a transmission wave. For example, the electronic device 150 or an obstacle may reflect the transmission wave, and the reflected wave may be received through the second antenna 425. The second antenna 425 may independently include a transmission-wave transmission antenna and a reflected-wave reception antenna, or may include at least one antenna capable of performing both transmission-wave transmission and reflected-wave reception. When the reflected wave is received, the second antenna 425 may transmit an electrical signal corresponding to the reflected wave to a low-noise amplifier (LNA) 426 through the duplexer 424. The LNA 426 may amplify an electric signal having a relatively small magnitude and may provide the amplified signal to a mixer 427. A third BPF 428 may provide an electrical signal having the second frequency to the mixer 427. A signal-processing circuit 429 may acquire a baseband signal based at least on the mixing result, and may sense at least one of the amplitude or the phase of the reflected wave. It will be appreciated by a person ordinarily skilled in the art that the mixer 427 may include a plurality of mixing circuits, and may be implemented using various circuits for extracting a baseband signal. The processor (e.g., the processor 320) may determine the position of at least one of an electronic device 150 or an obstacle based on at least one of the amplitude of the reflected wave, the phase of the reflected wave, or the time at which the reflected wave is received by the second antenna 425. The processor may control at least one of the first power amplifier 414 or a phase shifter connected to a patch antenna of the first antenna 415 such that an RF wave is formed toward the position of the electronic device 150. The processor may perform control so as to form RF waves such that an electromagnetic wave having a magnitude equal to or greater than a threshold is not applied to the living body.

Figure 5:
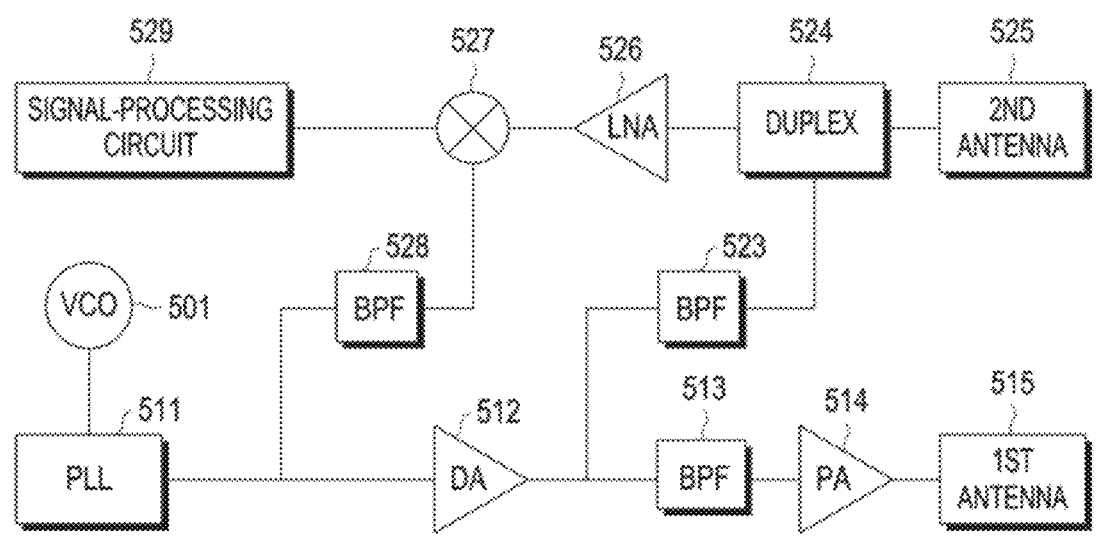
FIG. 5 illustrates a block diagram of a radar-type sensor and an RF-wave-shaping circuit, according to various embodiments.

FIG. 5 illustrates a block diagram of a radar-type sensor and an RF-wave-shaping circuit, according to various embodiments.

According to various embodiments, the wireless power transmission apparatus 100 may include one VCO 501. The VCO 501 may form a multi-band electrical signal. For example, the VCO 501 may form an electrical signal that includes both a first frequency used for charging and a second frequency used for radar operation. The PLL 511 may output a multi-band electric signal having a fixed first frequency and second frequency based on the difference between the phase of the electrical signal received from the VCO 501 and the phase of the signal output from the PLL 511. The PLL 511 may be included as at least a part of the VCO 501. A DA 512 may amplify a gain of the electrical signal and may transmit the gain-amplified electrical signal to a first BPF 513. The first BPF 513 may pass a first frequency band. The first BPF 513 may filter out a part having the second frequency. A first power amplifier 514 may amplify the filtered electrical signal having the first frequency and provide the amplified electrical signal to a first antenna 515. The first antenna 515 may form an RF wave for charging. A second BPF 523 may pass a second frequency band and may filter out the part having the first frequency. A duplexer 524 may transmit the electrical signal having the second frequency to a second antenna 525. The second antenna 525 may be, for example, an antenna constituting a radar, may form a transmission wave, and may receive a reflected wave. For receiving the reflected wave, the wireless power transmission apparatus 100 may include a heterodyne-type reception circuit or a homodyne-type reception circuit, and there is no limitation as to the reception type. When the reflected wave is received, the second antenna 525 may transmit an electrical signal corresponding to the reflected wave to an LNA 526 through the duplexer 524. The LNA 526 may amplify an electric signal having a relatively small magnitude, and may provide the amplified signal to a mixer 527. A third BPF 528 may provide an electrical signal having the second frequency to the mixer 527. A signal-processing circuit 529 may acquire a baseband signal based at least on the mixing result, and may sense at least one of the amplitude or the phase of the reflected wave. As described above, the wireless power transmission apparatus 100 according to various embodiments may perform RF wave shaping and radar transmission-wave transmission, for which the wireless power transmission apparatus 100 operates at different frequencies, even if the wireless power transmission apparatus includes only one VCO 501. In the embodiment of FIG. 5, the processor may simultaneously handle obstacle detection and RF wave transmission.

Figure 6:
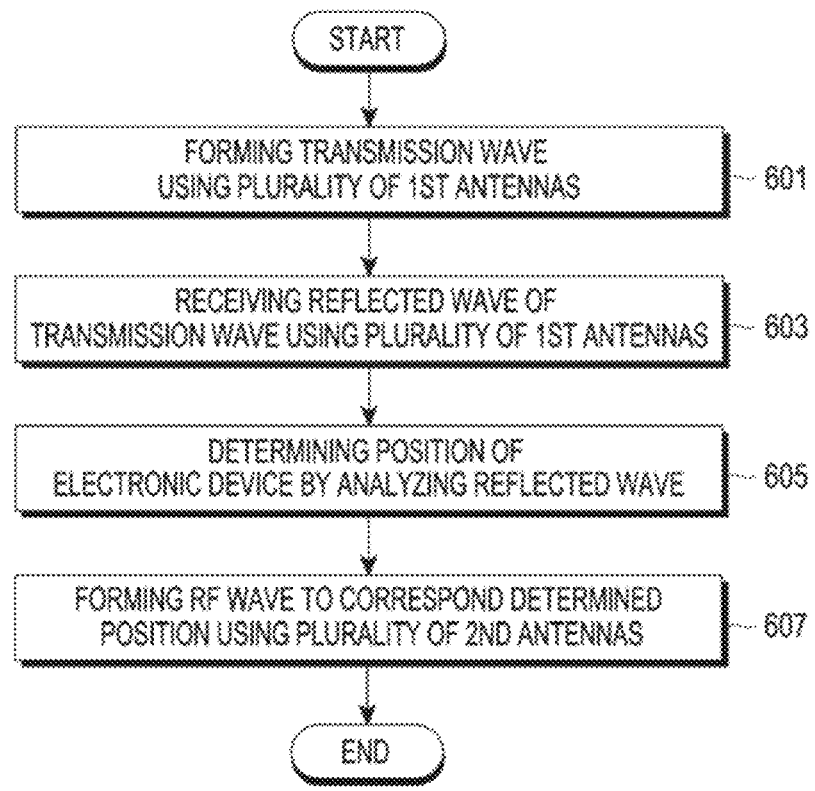
FIG. 6 is a flowchart for describing a method of operating a wireless power transmission apparatus according to various embodiments.
Figure 7:
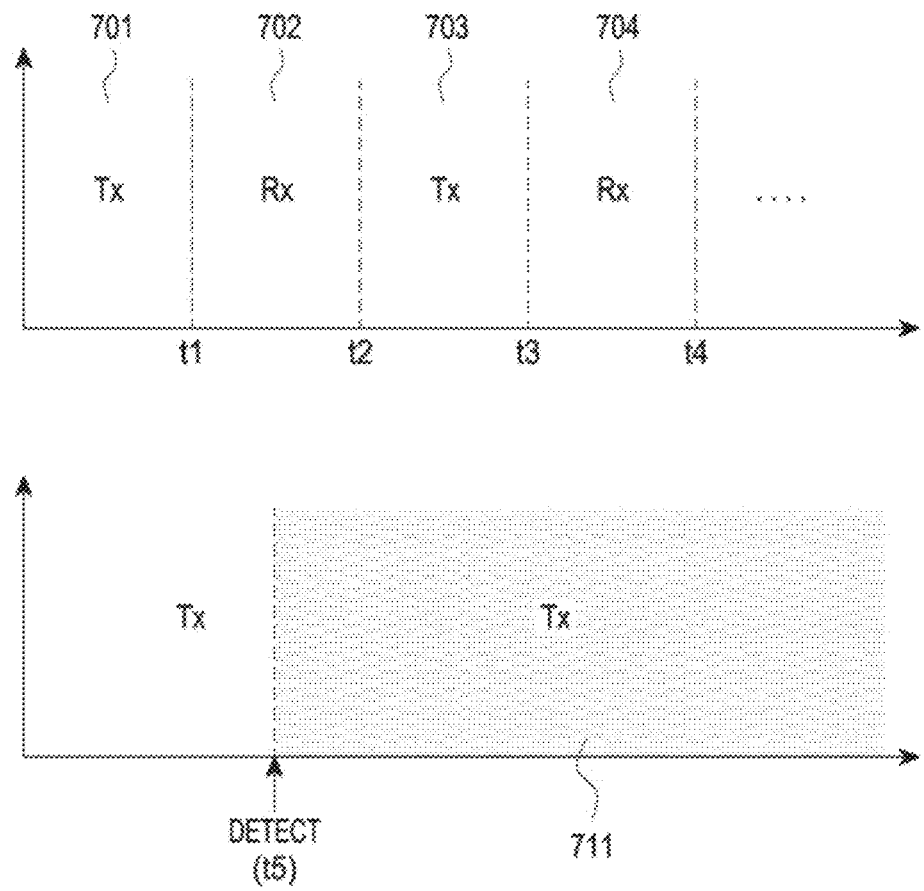
FIG. 7 is a diagram for describing an operating period of a wireless power transmission apparatus according to various embodiments.

FIG. 6 is a flowchart for describing a method of operating a wireless power transmission apparatus according to various embodiments. The embodiment of FIG. 6 will be described in more detail with reference to FIG. 7. FIG. 7 is a diagram for describing an operating period of a wireless power transmission apparatus according to various embodiments.

According to various embodiments, in operation 601, the wireless power transmission apparatus 100 may form a transmission wave using a plurality of first antennas. The first antennas may be, for example, antennas constituting a radar. In operation 603, the wireless power transmission apparatus 100 may receive a reflected wave of the transmission wave using the plurality of first antennas. For example, as illustrated in FIG. 7, the wireless power transmission apparatus 100 may form a transmission wave using the first antennas during a first period 701 from 0 to t1. In addition, the wireless power transmission apparatus 100 may receive a reflected wave using the first antennas during a second period 702 from t1 to t2. The wireless power transmission apparatus 100 may detect an electronic device at a time point t5 between t1 and t2. For example, the wireless power transmission apparatus 100 may determine that an electronic device is detected when it is determined that there is a change in the analysis information of the currently received reflected wave compared with the analysis information of the previously received reflected wave. Meanwhile, it is merely an example that the period for forming a transmission wave and the period for receiving a reflected wave are different from each other as in FIG. 7, and the wireless power transmission apparatus 100 according to various embodiments may perform the transmission of a transmission wave and the reception of a reflected wave together for the same period.

In operation 605, the wireless power transmission apparatus 100 may determine the position of an electronic device by analyzing the reflected wave. In operation 607, the wireless power transmission apparatus 100 may form an RF wave using a plurality of second antennas so as to correspond to the determined position. The second antennas may include, for example, a plurality of patch antennas for forming an RF wave. For example, as illustrated in FIG. 7, the wireless power transmission apparatus 100 may transmit an RF wave for a period 711 from t5 when the electronic device is detected. Meanwhile, the wireless power transmission apparatus 100 may also transmit a transmission wave or receive a reflected wave using the first antennas during a period 711 during which an RF wave is formed using the second antennas. For example, as in FIG. 7, the wireless power transmission apparatus 100 may also transmit a transmission wave during a third period 703 from t2 to t3. In addition, the wireless power transmission apparatus 100 may also receive a reflected wave during a fourth period 704 from t3 to t4. Accordingly, the wireless power transmission apparatus 100 may determine whether the electronic device moves or whether another electronic device moves nearby. When the electronic device moves, the wireless power transmission apparatus 100 may control the second antenna such that an RF wave is formed toward the new position of the electronic device. Alternatively, when it is detected that another electronic device enters the charging area of the wireless power transmission apparatus 100, the wireless power transmission apparatus 100 may form an RF wave to charge both the electronic device and the another electronic device. For example, the wireless power transmission apparatus 100 may alternately charge a plurality of electronic devices in a time-division manner. Alternatively, the wireless power transmission apparatus 100 may perform charging according to the priorities of a plurality of electronic devices. Alternatively, the wireless power transmission apparatus 100 may control the plurality of patch antennas such that a first group of the patch antennas charges one electronic device and a second group of the patch antennas charges another electronic device.

In another embodiment, the wireless power transmission apparatus 100 may detect various obstacles other than an electronic device 150 using a reflected wave, and may determine the position of the electronic device 150 using a communication signal from the electronic device 150. For example, the wireless power transmission apparatus 100 may include a plurality of communication antennas, and, based at least on the difference between time points of receiving a communication signal from the electronic device 150 received by each of the plurality of communication antennas, the wireless power transmission apparatus 100 may determine the direction of the electronic device 150. The wireless power transmission apparatus 100 may determine the distance between the wireless power transmission apparatus 100 and the electronic device 150 based at least on the difference between the reception intensity of the communication signal and the transmission intensity of the communication signal. The wireless power transmission apparatus 100 may determine the position of the electronic device 150 with reference to the wireless power transmission apparatus 100 based at least on the determined direction of the electronic device 150 and the determined distance to the electronic device 150. For example, the wireless power transmission apparatus 100 may determine the position of the electronic device 150 based at least on a vision recognition result, and there is no limitation on the configuration for determining the position of the electronic device 150 in the wireless power transmission apparatus 100.

Figure 8:
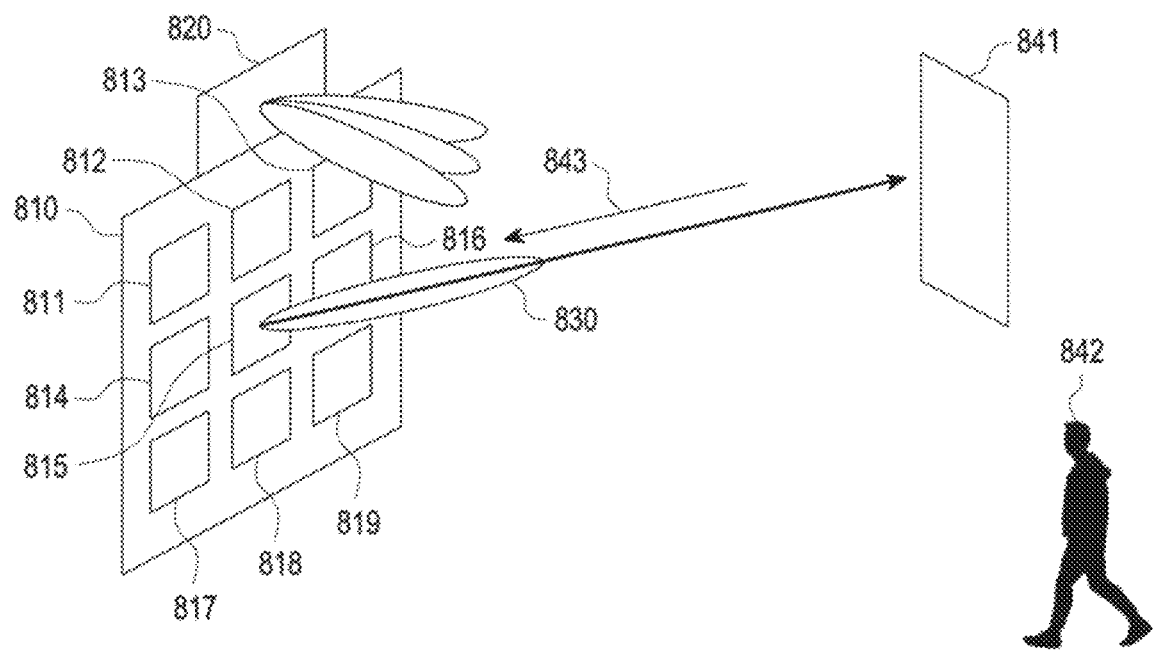
FIG. 8 is a diagram illustrating a wireless power transmission apparatus that simultaneously performs detection and charging of an electronic device according to various embodiments.

FIG. 8 is a diagram illustrating a wireless power transmission apparatus that simultaneously performs detection and charging of an electronic device according to various embodiments.

According to various embodiments, the wireless power transmission apparatus 100 may include a plurality of patch antennas 811 to 819 and a radar-type sensor 820. The wireless power transmission apparatus 100 may form transmission waves 821, 822, and 823 sequentially or simultaneously in at least one direction using the sensor 820. The sensor 820 may receive reflected waves with respect to the transmission waves 821, 822, and 823, and may determine the position of an electronic device 841 or an obstacle 842 based on the result of analysis of the reflected waves. The electronic device 841 may transmit a communication signal 843. The wireless power transmission apparatus 100 may determine the point at which the communication signal 843 is generated, and thus may determine whether the detected object is an electronic device or an obstacle. For example, the wireless power transmission apparatus 100 may determine that the detected object is an electronic device when the position of the detected object corresponds to the position where the communication signal 843 is generated. Alternatively, the wireless power transmission apparatus 100 may determine that the detected object is an electronic device when the time point at which the object is detected corresponds to the time point at which the communication signal 843 is detected. The wireless power transmission apparatus 100 may control the plurality of patch antennas 811 to 819 such that the RF wave 830 is applied only to the electronic device 841 and is not applied to the obstacle 842.

As the wireless power transmission apparatus 100 includes all of the patch antennas 811 to 819 and the separate sensor 820 for RF wave formation, the wireless power transmission apparatus 100 may simultaneously perform object detection and charging through RF wave formation. Accordingly, the wireless power transmission apparatus 100 may charge the electronic device 841 relatively quickly. For example, when the wireless power transmission apparatus 100 uses a beam-splitting scheme with respect to a multi-target device, the wireless power transmission apparatus 100 may simultaneously form a plurality of RF waves for multiple targets, but may not form additional RF waves for target detection. For example, when the wireless power transmission apparatus 100 uses a time-division scheme, the wireless power transmission apparatus 100 may not allocate an additional period for target detection. That is, the wireless power transmission apparatus 100 may charge the electronic device 841 relatively quickly since the wireless power transmission apparatus 100 does not need to perform patch antenna allocation or use time allocation of the patch antennas for RF wave formation in order to detect an object.

Meanwhile, the wireless power transmission apparatus 100 may receive a communication signal 843 including information sensed by the electronic device 841. For example, the electronic device 841 may include information associated with the movement of the electronic device 841 in the communication signal 843, and may transmit the communication signal 843. The wireless power transmission apparatus 100 may determine the position of the electronic device 841 using the information included in the communication signal 843 as well as the information acquired through the sensor 820. Alternatively, the electronic device 841 may include information associated with the magnitude of the received power (e.g., at least one of a current value, a voltage value, or a power value at the input terminal or the output terminal of the rectifier) in the communication signal 843, and may transmit the communication signal 843. The wireless power transmission apparatus 100 may adjust the magnitude of an RF wave based on information included in the communication signal 843.

Figure 9:
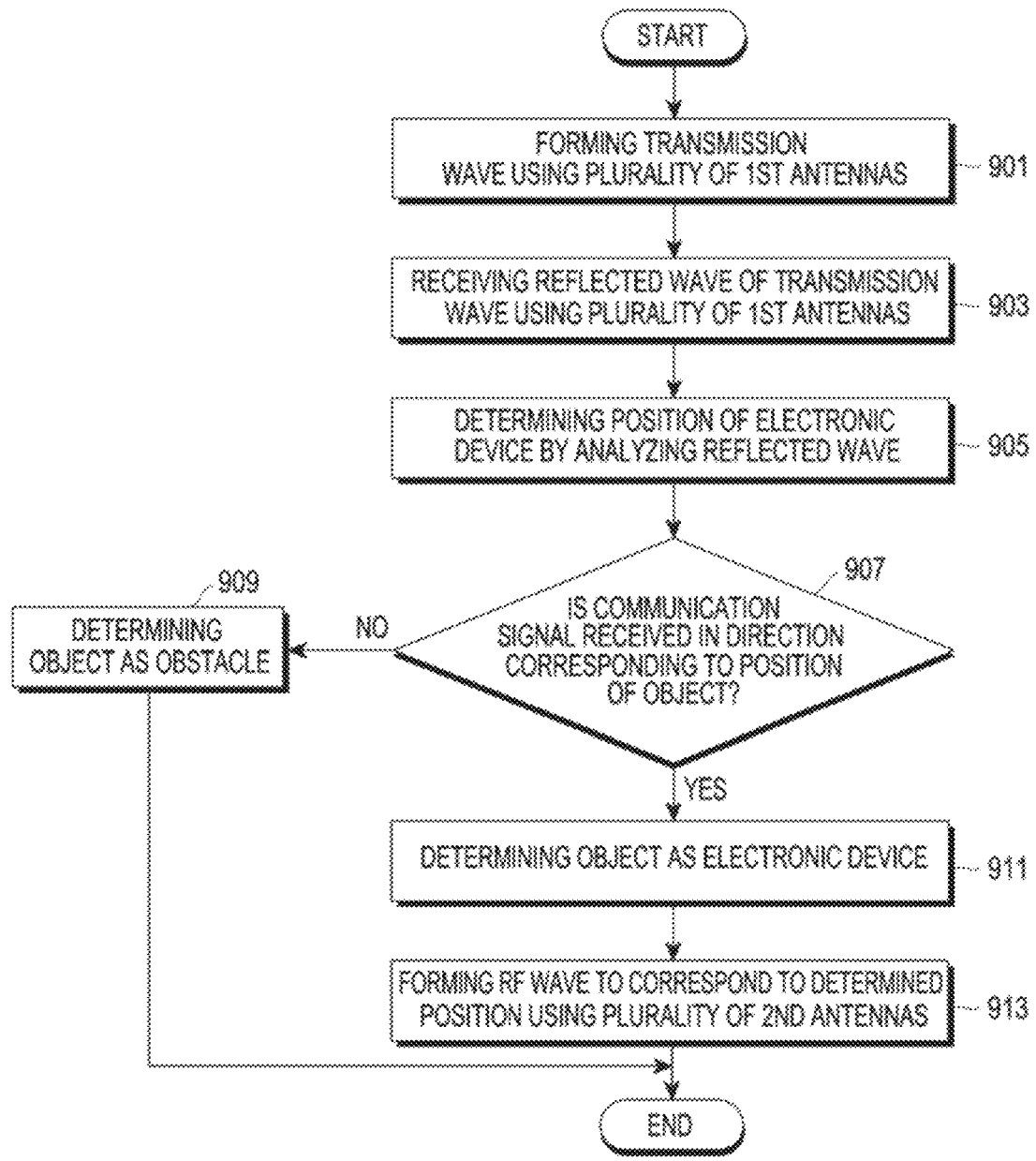
FIG. 9 is a flowchart illustrating a method of operating a wireless power transmission apparatus according to various embodiments.

FIG. 9 is a flowchart illustrating a method of operating a wireless power transmission apparatus according to various embodiments.

According to various embodiments, in operation 901, the wireless power transmission apparatus 100 may form a transmission wave using a plurality of first antennas. In operation 903, the wireless power transmission apparatus 100 may receive a reflected wave of the transmission wave using the plurality of first antennas. The first antenna may be included in, for example, a radar-type sensor for determining the position of an external object. In operation 905, the wireless power transmission apparatus 100 may determine the position of an object by analyzing the reflected wave. In operation 907, the wireless power transmission apparatus 100 may determine whether a communication signal is received from a direction corresponding to the position of an object. The wireless power transmission apparatus 100 may determine the direction in which the communication signal is transmitted based at least on the difference between the time points at which the communication signal is received by respective ones of the plurality of communication antennas. The wireless power transmission apparatus 100 may compare information included in the communication signal (e.g., transmission intensity or transmission time) with sensed information (e.g., reception intensity or reception time), and may determine the distance between the power transmission device 100 and the electronic device based at least on the comparison result. The wireless power transmission apparatus 100 may determine the position of the electronic device based on the determined direction and distance. The wireless power transmission apparatus 100 may compare the position of the electronic device, determined using the communication signal, with the position of an object, determined based on a sensor. When the difference between the two positions is determined to be greater than or equal to a threshold as a result of the comparison, in operation 909, the wireless power transmission apparatus 100 may determine that the object determined based on the sensor is not an electronic device but an obstacle. When no communication signal is received, the wireless power transmission apparatus 100 may determine that the object determined based on the sensor is not an electronic device. When the difference between the two positions is determined to be less than a threshold as a result of the comparison, in operation 911, the wireless power transmission apparatus 100 may determine that the object determined based on the sensor is an electronic device. In operation 913, the wireless power transmission apparatus 100 may form an RF wave using a plurality of second antennas to correspond to the determined position. In various embodiments of the disclosure, even if it is determined that a communication signal is received from a detected object, when the electronic device identified based on the identification information in the communication signal is an electronic device that is not allowed to be charged, the wireless power transmission apparatus 100 may determine the corresponding object to be an obstacle.

According to various embodiments, the wireless power transmission apparatus 100 may determine the position of an electronic device through image analysis. For example, when a user is holding an electronic device, the wireless power transmission apparatus 100 may determine the correct position of the electronic device through additional image analysis. When it is determined that the user is holding an electronic device, the wireless power transmission apparatus 100 may sharply adjust the beam width of the RF wave. For example, the wireless power transmission apparatus 100 may adjust the beam width of the RF wave by adjusting the number of patch antennas sharing a control degree of phase or a control degree of amplitude. For example, when the wireless power transmission apparatus 100 includes 256 (16×16) patch antennas, an RF wave having a first beam width may be formed by differently setting the control degree of at least one of the phase or the amplitude of each of the 256 patch antennas. The wireless power transmission apparatus 100 may set the control degree of at least one of the phase or the amplitude for 4 (2×2) patch antennas. When the patch antennas having the same set conditions are named as a group, the wireless power transmission apparatus 100 may set the number of patch antennas in a group to four. In this case, an RF wave having a second beam width larger than the first beam width may be formed. The wireless power transmission apparatus 100 may adjust the beam width of an RF wave by adjusting the number of patch antennas in a group. For example, when the user holds the electronic device, the wireless power transmission apparatus 100 may set the beam width of the RF wave to be relatively small such that the RF wave is applied only to the electronic device, without being applied to the user. The wireless power transmission apparatus 100 may set the beam width of the RF wave for each body part adjacent to the electronic device. For example, permissible numerical values of electromagnetic waves may vary for different body parts of the user, and accordingly, the wireless power transmission apparatus 100 may set the beam width of the RF wave for each body part adjacent to the electronic device.

The wireless power transmission apparatus 100 may determine an RF wave transmission condition using the electromagnetic wave generation information of the electronic device 150. For example, when the user holds the electronic device 150 while on the phone, the electronic device 150 may generate an electromagnetic wave having a relatively large magnitude. The wireless power transmission apparatus 100 may reduce the magnitude of an RF wave formed corresponding thereto. The wireless power transmission apparatus 100 may further reduce the preset magnitude of the RF wave. For example, the electronic device 150 may determine whether the user places the electronic device 150 near the head while on the phone based on the information of a proximity sensor. Information thereon may be transmitted to the wireless power transmission apparatus 100.

Figure 10A:
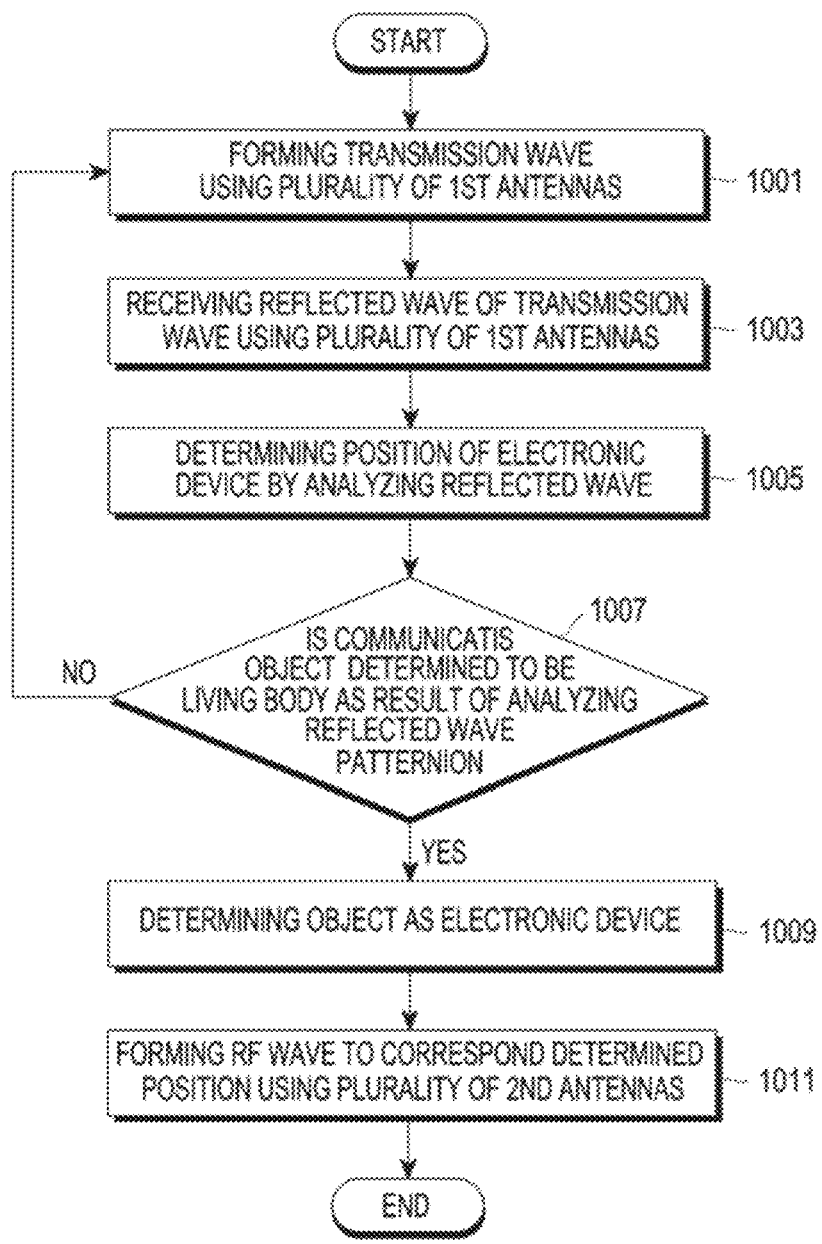
FIG. 10A is a flowchart for describing a method of operating an electronic device that determines whether or not a detected object is a living body, according to various embodiments.
Figure 10B:
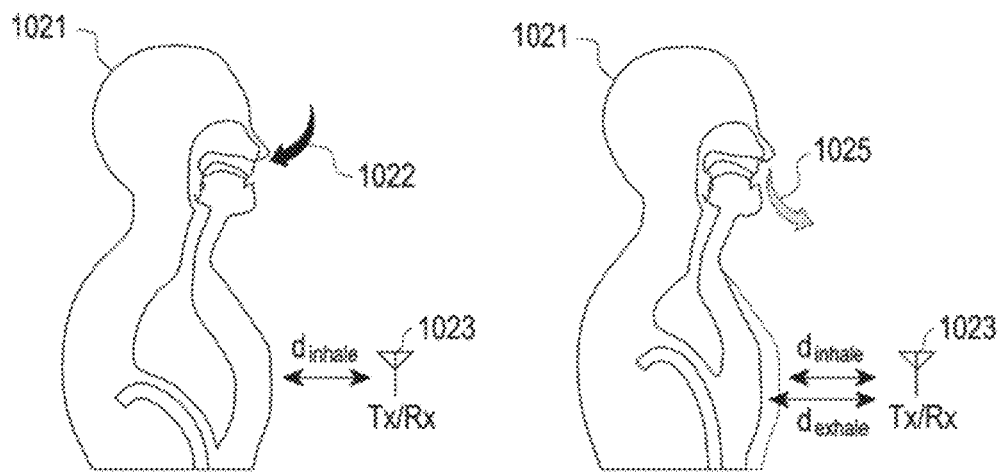
FIG. 10B is a view for describing an inhalation and exhalation process of a living body.
Figure 10C:
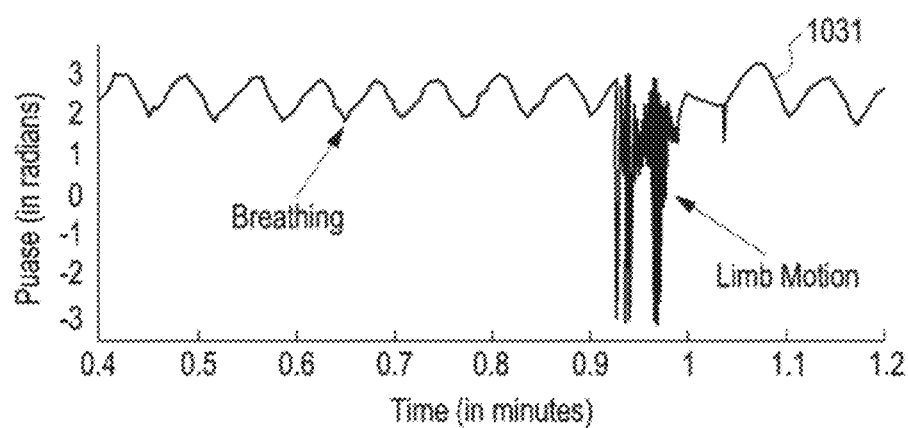
FIG. 10C illustrates sensing data according to various embodiments.
Figure 10D:
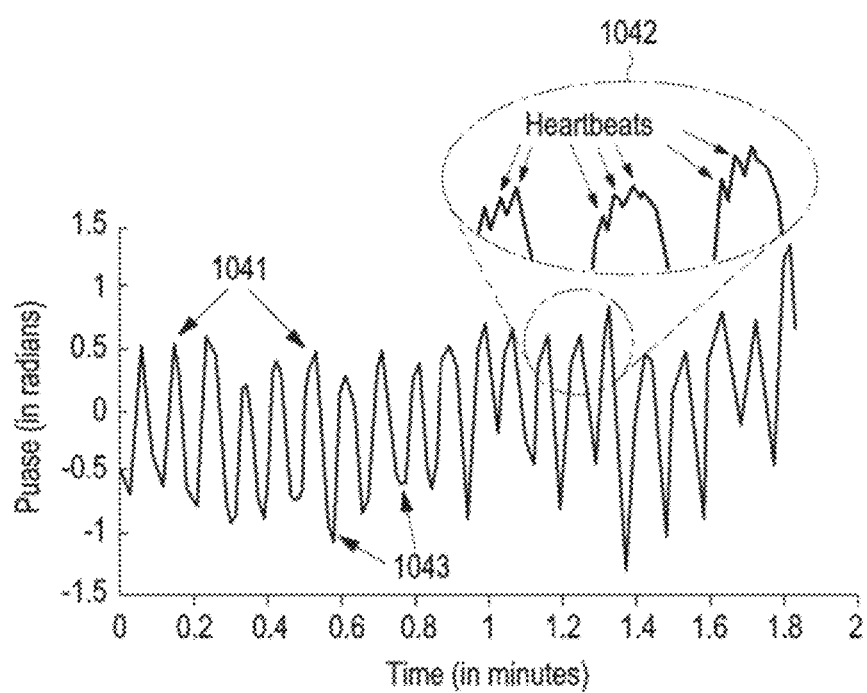
FIG. 10D illustrates sensing data according to various embodiments.

FIG. 10A is a flowchart for describing a method of operating an electronic device that determines whether or not a detected object is a living body, according to various embodiments. The embodiment of FIG. 10A will be described in more detail with reference to FIGS. 10B to 10D. FIG. 10B is a view for describing an inhalation and exhalation process of a living body, and FIGS. 10C and 10D illustrate sensing data according to various embodiments.

According to various embodiments, in operation 1001, the wireless power transmission apparatus 100 may form a transmission wave using a plurality of first antennas. In operation 1003, the wireless power transmission apparatus 100 may receive a reflected wave of the transmission wave using the plurality of first antennas. In operation 1005, the wireless power transmission apparatus 100 may determine the position of an object by analyzing the reflected wave. In operation 1007, the wireless power transmission apparatus 100 may determine whether the object is a living body based on a result of analysis of a reflected wave pattern. For example, as in FIG. 10B, the living body may periodically move as it performs breathing. When a person 1021 inhales (1022), the ribcage may ascend, in which case the distance between the antenna 1023 of the sensor and the ribcage may be a first distance $d_{inhale}$. When the person 1021 exhales (1025), the ribcage may descend, in which case the distance between the antenna 1023 of the sensor and the ribcage may be a second distance $d_{exhale}$. As the person 1021 continuously performs breathing, the wireless power transmission apparatus 100 may identify that the phase 1031 of the reflected wave is periodically changed, for example, as illustrated in FIG. 10C. Alternatively, the wireless power transmission apparatus 100 may identify that the phase of the reflected wave includes a portion 1041 corresponding to exhalation, a portion 1043 corresponding to inhalation, and a portion 1042 corresponding to heartbeat, for example, as in FIG. 10D. Accordingly, the wireless power transmission apparatus 100 may identify that the detected object is a living body. The wireless power transmission apparatus 100 may analyze the reflected wave and may determine that the reflection coefficient of the object on which the transmission wave is reflected corresponds to the reflection coefficient of a biological tissue. Accordingly, the wireless power transmission apparatus 100 may determine whether the detected object is a living body.

In operation 1009, when it is determined that the object is an electronic device, in operation 1011, the wireless power transmission apparatus 100 may form an RF wave using a plurality of second antennas to correspond to the determined position. Meanwhile, when it is determined that the object is a living body, even if the wireless power transmission apparatus 100 transmits the RF wave to another electronic device, it is possible to determine the transmission conditions of the RF wave such that the RF wave is not applied to the corresponding object.

Figure 10E:
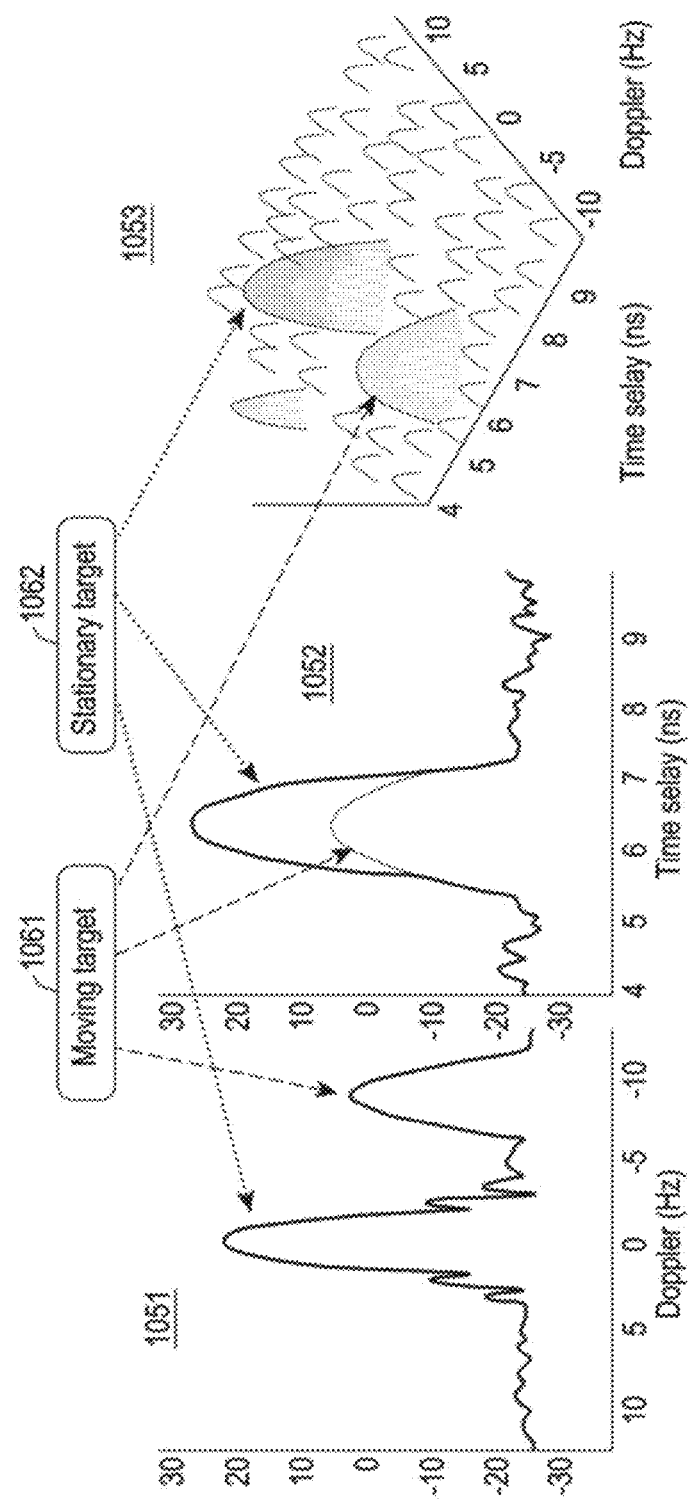
FIG. 10E is a diagram for describing a process of determining a moving object according to various embodiments.

FIG. 10E is a diagram for describing a process of determining a moving object according to various embodiments. Referring to FIG. 10E, the wireless power transmission apparatus 100 according to various embodiments may determine two peak points in a frequency area 1501 according to the Doppler effect of a reflected wave as a moving target 1061 and a stationary target 1602, respectively. The wireless power transmission apparatus 100 may determine two peak points in the time delay area 1052 of the reflected wave as a moving target 1061 and a stationary target 1062, respectively. The wireless power transmission apparatus 100 may determine two peak points in an area in which the frequency and the time delay according to the Doppler effect are expressed as a moving target 1061 and a stationary target 1062, respectively. The wireless power transmission apparatus 100 may determine, for example, the moving target 1061 to be a living body such as a person.

Figure 11A:
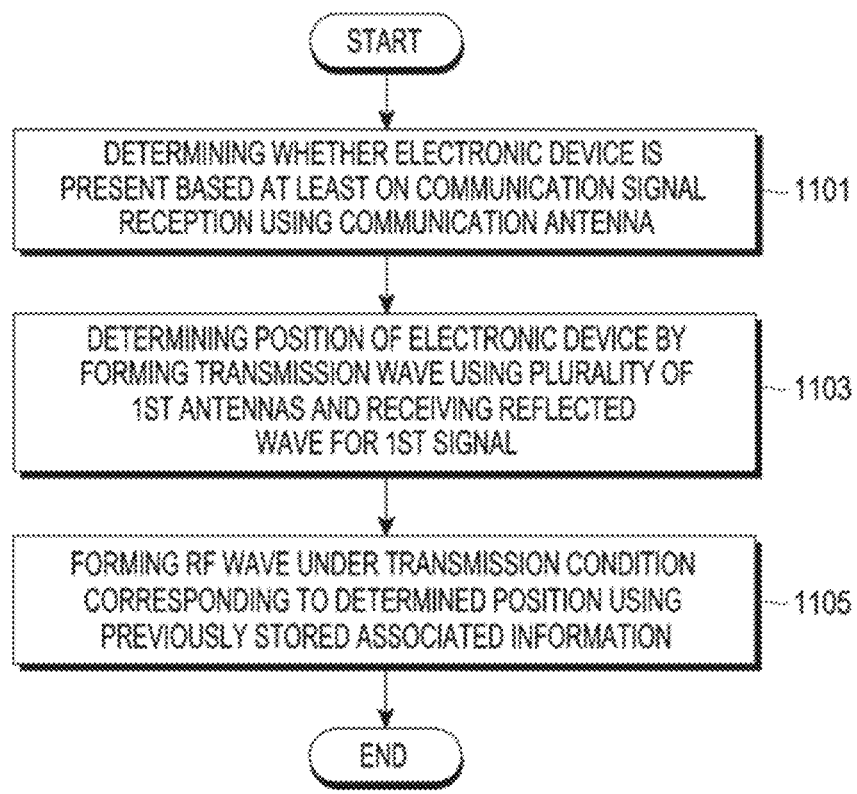
FIG. 11A is a flowchart for describing a method of operating a wireless power transmission apparatus according to various embodiments.
Figure 11B:
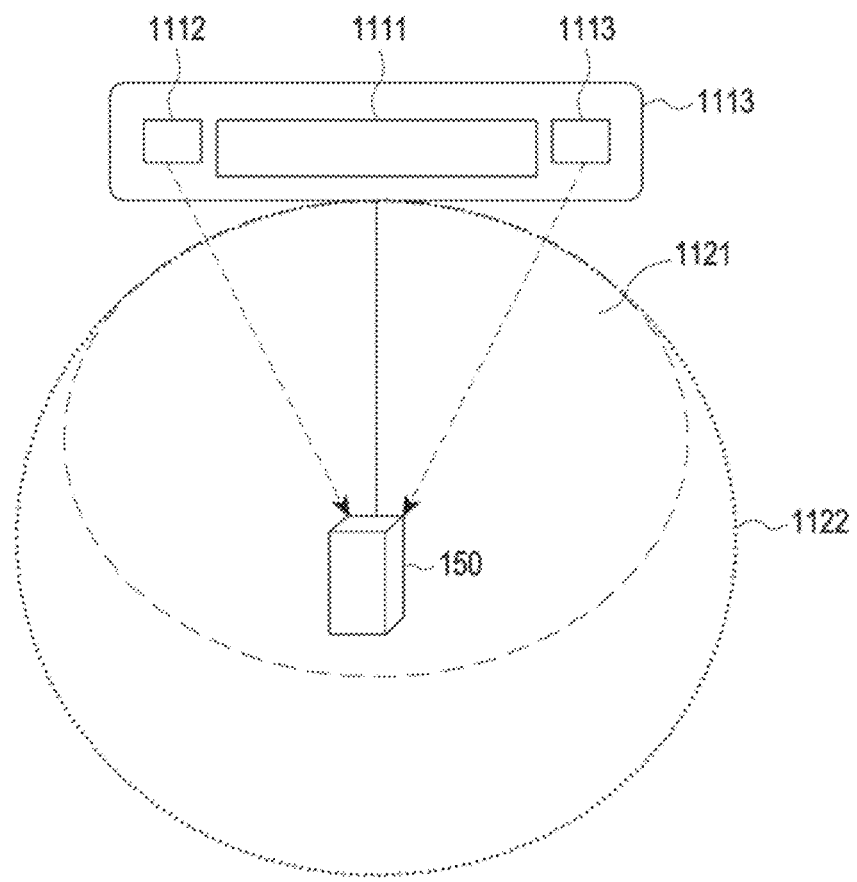
FIG. 11B is a diagram for describing an area around a wireless power transmission apparatus according to various embodiments.

FIG. 11A is a flowchart for describing a method of operating a wireless power transmission apparatus according to various embodiments. The embodiment of FIG. 11A will be described in more detail with reference to FIG. 11B. FIG. 11B is a diagram for describing an area around a wireless power transmission apparatus according to various embodiments.

According to various embodiments, in operation 1101, the wireless power transmission apparatus 100 may determine whether an electronic device is present based at least on reception of a communication signal using a communication antenna. In an embodiment, the reception of a communication signal containing new identification information may be used as a trigger for transmission wave formation. In operation 1103, the wireless power transmission apparatus 100 may form a transmission wave using a plurality of first antennas, and may receive a reflected wave for a first signal to determine the position of the electronic device. For example, as in FIG. 11B, the wireless power transmission apparatus 100 may include first antennas 1112 and 1113 for determining the position of an electronic device 150 and a second antenna 1111 for forming an RF wave. The wireless power transmission apparatus 100 may determine the position of the electronic device 150 in a relatively close area 1121 using reflected waves received through the first antennas 1112 and 1113. For example, when the electronic device ISO is located in a relatively distant area 1122, the wireless power transmission apparatus 100 may detect the electronic device 150 using a communication signal, but may not perform charging. In operation 1105, the wireless power transmission apparatus 100 may form an RF wave using previously stored associated information under a transmission condition corresponding to the determined position.

Figure 12:
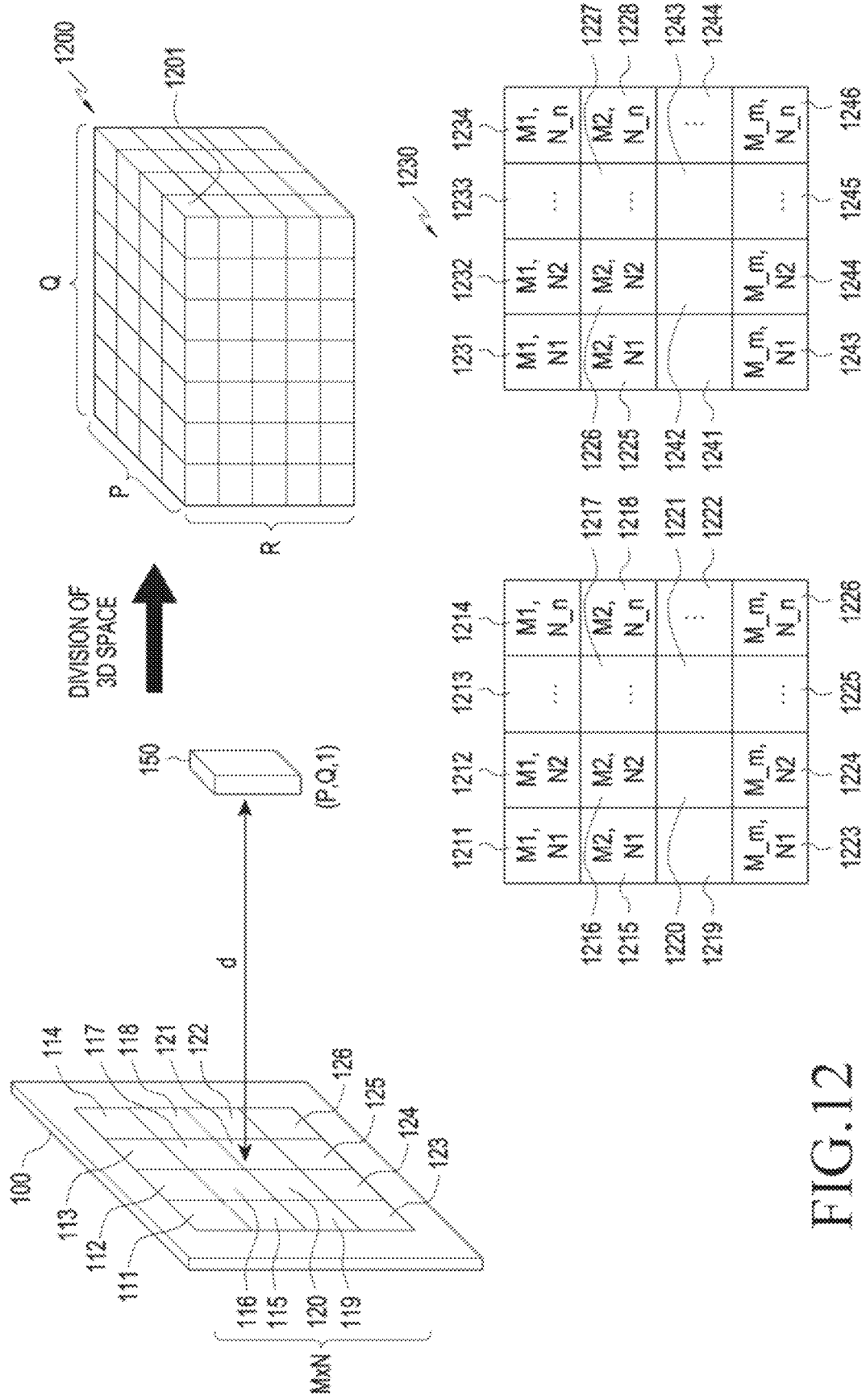
FIG. 12 is a view for describing associated information according to various embodiments.

FIG. 12 is a view for describing associated information according to various embodiments.

Referring to FIG. 12, the wireless power transmission apparatus 100 may include a plurality of patch antennas 111 to 126. An electronic device 150 may be located at a position spaced apart from the wireless power transmission apparatus 100 by a distance d. The wireless power transmission apparatus 100 may determine that the position of the electronic device 150 corresponds to the spatial coordinates (P, Q, 1) according to the various schemes described above. The wireless power transmission apparatus 100 may divide the surrounding space into, for example, P×Q×R subspaces 1200, and may allocate spatial coordinates (e.g., coordinates (i, j, k) (i is a natural number of 1 or more and P or less, j is a natural number of 1 or more and Q or less, and k is a natural number of 1 or more and R or less)) to each of the subspaces. For beamforming at, for example, coordinates 1201 of (i, j, k), the wireless power transmission apparatus 100 may store in advance associated information 1210 indicating that the phase control degree of a patch antenna Ta,b among the plurality of patch antennas is Φa,b and associated information 1230 indicating that the amplitude magnitude is Aa,b. Here, a may be a natural number of 1 or more and M or less, and b may be a natural number of 1 or more and N or less. The wireless power transmission apparatus 100 may control the amplitude of an electrical signal input to each of the patch antennas 111 to 126 according to information 1211 to 1216 of an amplitude magnitude for each patch antenna included in the associated information 1210. In FIG. 12, at Mi, Nj described in the information 1211 to 1216 of the amplitude magnitude for each patch antenna, i is a natural number of 1 or more and M or less, and j is a natural number of 1 or more and N or less. Mi, Nj represents a patch antenna of (i, j) in the antenna array of M×N. Thus, M1, N1 1211 represents amplitude information of an electrical signal applied to the patch antenna of (1, 1). In addition, M1, N1 1231 may indicate the adjustment degree of phase of an electrical signal applied to the patch antenna of (1, 1). The wireless power transmission apparatus 100 may control the phase of an electrical signal input to each of the patch antennas 111 to 126 according to information 1231 to 1246 of the control degree of phase for each patch antenna included in the associated information 1230.

The wireless power transmission apparatus 100 according to various embodiments may determine the movement of an electronic device. The wireless power transmission apparatus 100 may determine the new position of the electronic device 150 using data from a sensor. Alternatively, the wireless power transmission apparatus 100 may receive movement information of the electronic device 150 from the electronic device 150, and, based at least on this, the wireless power transmission apparatus 100 may determine the new position of the electronic device 150. The wireless power transmission apparatus 100 may determine the new position of the electronic device 150, that is, new spatial coordinates, and may determine corresponding transmission conditions. Accordingly, the wireless power transmission apparatus 100 may form an RF wave while trucking the electronic device 150 by rapidly changing the transmission conditions based on the new position.

Figure 13:
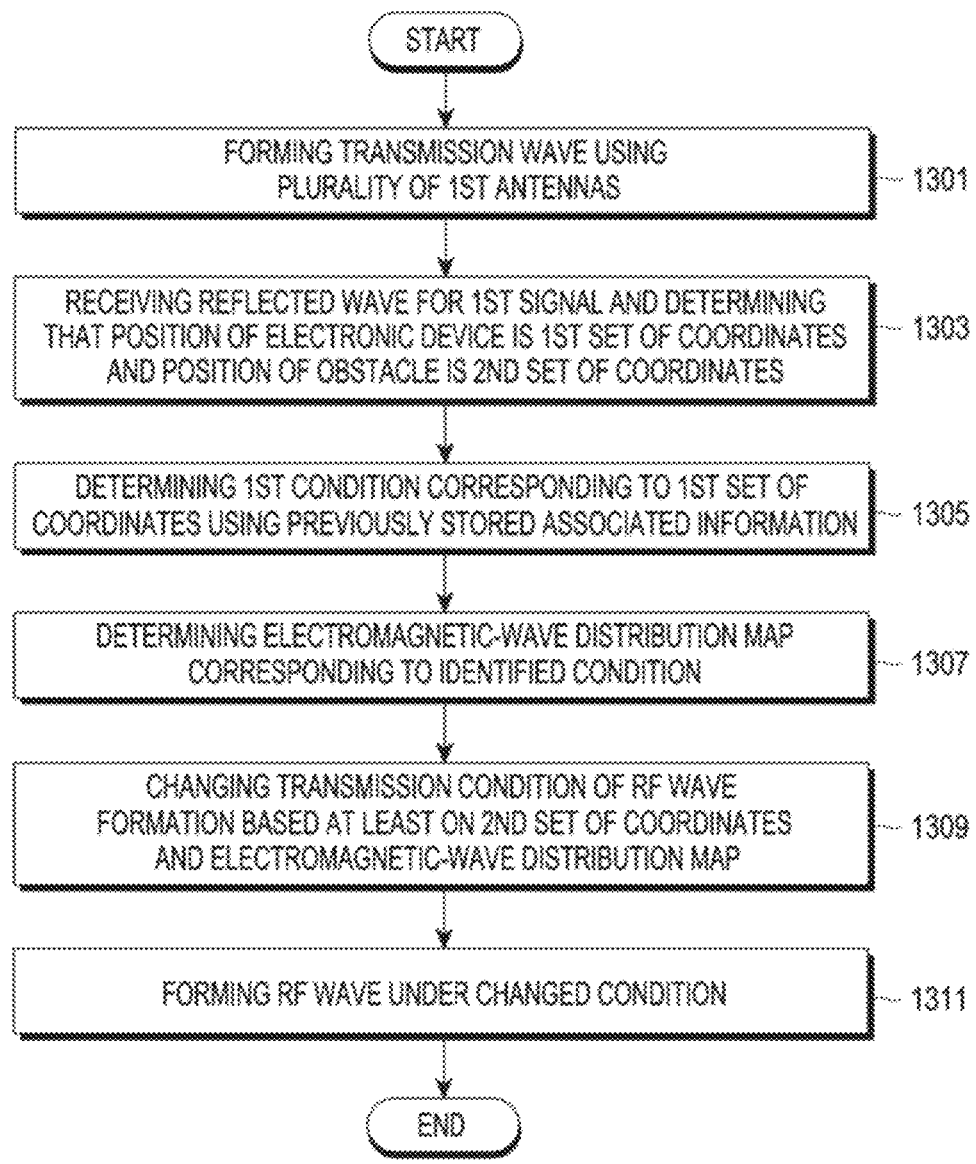
FIG. 13 is a flowchart illustrating a method of operating a wireless power transmission apparatus according to various embodiments.
Figure 14A:
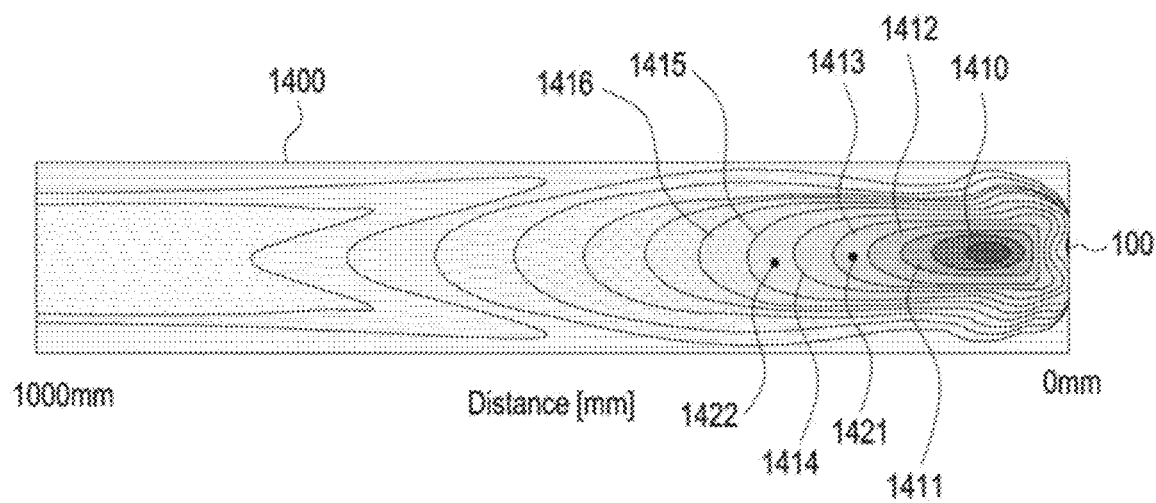
FIG. 14A illustrates an electromagnetic-wave distribution map according to various embodiments.
Figure 14B:
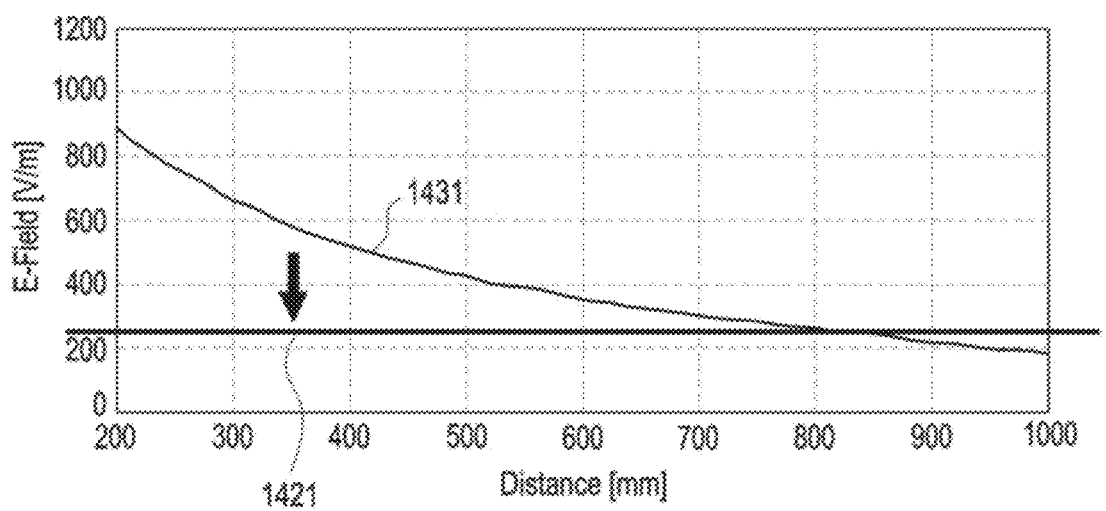
FIG. 14B illustrates an electromagnetic-wave distribution map according to various embodiments.

FIG. 13 is a flowchart for describing a method of operating a wireless power transmission apparatus according to various embodiments. The embodiment of FIG. 13 will be described in more detail with reference to FIGS. 14A and 14B. FIGS. 14A and 14B illustrate electromagnetic-wave distribution maps according to various embodiments.

According to various embodiments, in operation 1301, the wireless power transmission apparatus 100 may form a transmission wave using a plurality of first antennas. In operation 1303, the wireless power transmission apparatus 100 may receive a reflected wave for a first signal and may determine that the position of the electronic device corresponds to a first set of coordinates and that the position of the obstacle corresponds to a second set of coordinates. For example, the wireless power transmission apparatus 100 may divide the surrounding space into a plurality of subspaces 1200, and may allocate spatial coordinates to each of the subspaces 1200. The wireless power transmission apparatus 100 may determine that objects are located at the first set of coordinates and the second set of coordinates. Each of the first set of coordinates and the second set of coordinates may represent one set of coordinates, but may be represented by a range in another embodiment. As described above, the wireless power transmission apparatus 100 may determine whether an object detected as a result of analysis of a reflected wave is an electronic device or an obstacle based on at least one of determination as to whether a communication signal is formed or a result of analysis of a reflected wave pattern. Accordingly, the wireless power transmission apparatus 100 may determine that an electronic device is located at the first set of coordinates and a that person is located at the second set of coordinates.

In operation 1305, the wireless power transmission apparatus 100 may determine a first condition corresponding to the first set of coordinates (e.g., 1201 in FIG. 12) using previously stored associated information. As in FIG. 12, the wireless power transmission apparatus 100 may store associated information including at least one of the adjustment degree of phase or amplitude information associated with each of the plurality of patch antennas and corresponding to each set of spatial coordinates. The wireless power transmission apparatus 100 may select associated information corresponding to the first set of coordinates. The wireless power transmission apparatus 100 may identify transmission conditions corresponding to each of a plurality of patch antennas, for example, a phase adjustment degree 1230 or amplitude information 1230 of an electrical signal input to each of the plurality of patch antennas, with reference to the associated information.

In operation 1305, the wireless power transmission apparatus 100 may determine an electromagnetic-wave distribution map corresponding to an identified condition. In an embodiment, the wireless power transmission apparatus 100 may store, in advance, electromagnetic-wave distribution maps corresponding to various transmission conditions. For example, when the transmission conditions of each of the plurality of patch antennas Ta,b are Φa,b and Aa,b, an electromagnetic-wave distribution map indicating the magnitudes of RF waves formed from the plurality of patch antennas may be stored in the wireless power transmission apparatus 100, or may be formed by the wireless power transmission apparatus 100. For example, the wireless power transmission apparatus 100 may read an electromagnetic-wave distribution map 1400 corresponding to a first condition as in FIG. 14. In the electromagnetic-wave distribution map 1400, a plurality of magnitude ranges 1410 to 1416 may be indicated, and may correspond to RF waves formed from the wireless power transmission apparatus 100. The electromagnetic-wave distribution map 1400 may be divided into, for example, P×Q×R subspaces, and each of divided spatial coordinates may include the magnitude of an electromagnetic wave. Alternatively, the electromagnetic-wave distribution map 1400 may be implemented to include only a boundary line of a range exceeding a threshold. Accordingly, as in FIG. 14, a first set of coordinates 1421 and a second set of coordinates 1422 may be located on the electromagnetic-wave distribution map 1400. The wireless power transmission apparatus 100 may determine whether the magnitude of an electromagnetic wave at the second set of coordinates 1422, which is the position of a person, exceeds a threshold. For example, as in FIG. 14B, as the distance from the generation source increases, the magnitude 1431 of the RF wave may decrease. Meanwhile, there may be various protocols associated with specific absorption rate (SAR), electromagnetic interference (EMI), electromagnetic susceptibility (EMS), electromagnetic compatibility (EMC), maximum permissible exposure (MPE), etc., and the threshold 1421 may be set to satisfy the corresponding protocol. The threshold 1432 may be set variably, for example, for each body portion or for each living body type. When it is determined that the magnitude of an electromagnetic wave at a position (e.g., the second set of coordinates 1422) of a living body identified in the electromagnetic-wave distribution map exceeds the threshold, the wireless power transmission apparatus 100 may change the transmission conditions of the RF wave.

In operation 1307, the wireless power transmission apparatus 100 may change the transmission conditions of an RF wave based at least on the second set of coordinates and the electromagnetic-wave distribution map. For example, the wireless power transmission apparatus 100 may reduce the magnitude of an electrical signal input to the patch antennas. Alternatively, the wireless power transmission apparatus 100 may change the direction of an RF wave. The wireless power transmission apparatus 100 may change the transmission conditions of the RF wave such that the magnitude of an electromagnetic wave at the second set of coordinates does not exceed a threshold. The wireless power transmission apparatus 100 may select a transmission condition in which the magnitude of the electromagnetic wave at the first set of coordinates is the largest among the transmission conditions in which the magnitude of the electromagnetic wave at the second set of coordinates does not exceed the threshold. In operation 1311, the wireless power transmission apparatus 100 may form an RF wave under the changed conditions. That is, the wireless power transmission apparatus 100 may set transmission condition candidates depending on the position of an electronic device 150. Before forming the RF wave, the wireless power transmission apparatus 100 may exclude a transmission condition candidate that causes an electromagnetic wave having a magnitude exceeding a threshold to be applied to a living body among the transmission condition candidates using an electromagnetic distribution map corresponding to each of a plurality of transmission conditions. The wireless power transmission apparatus 100 may wirelessly transmit power to the electronic device 150 without applying an electromagnetic wave exceeding a threshold to a living body by forming an RF wave under the determined transmission conditions.

Figure 15:
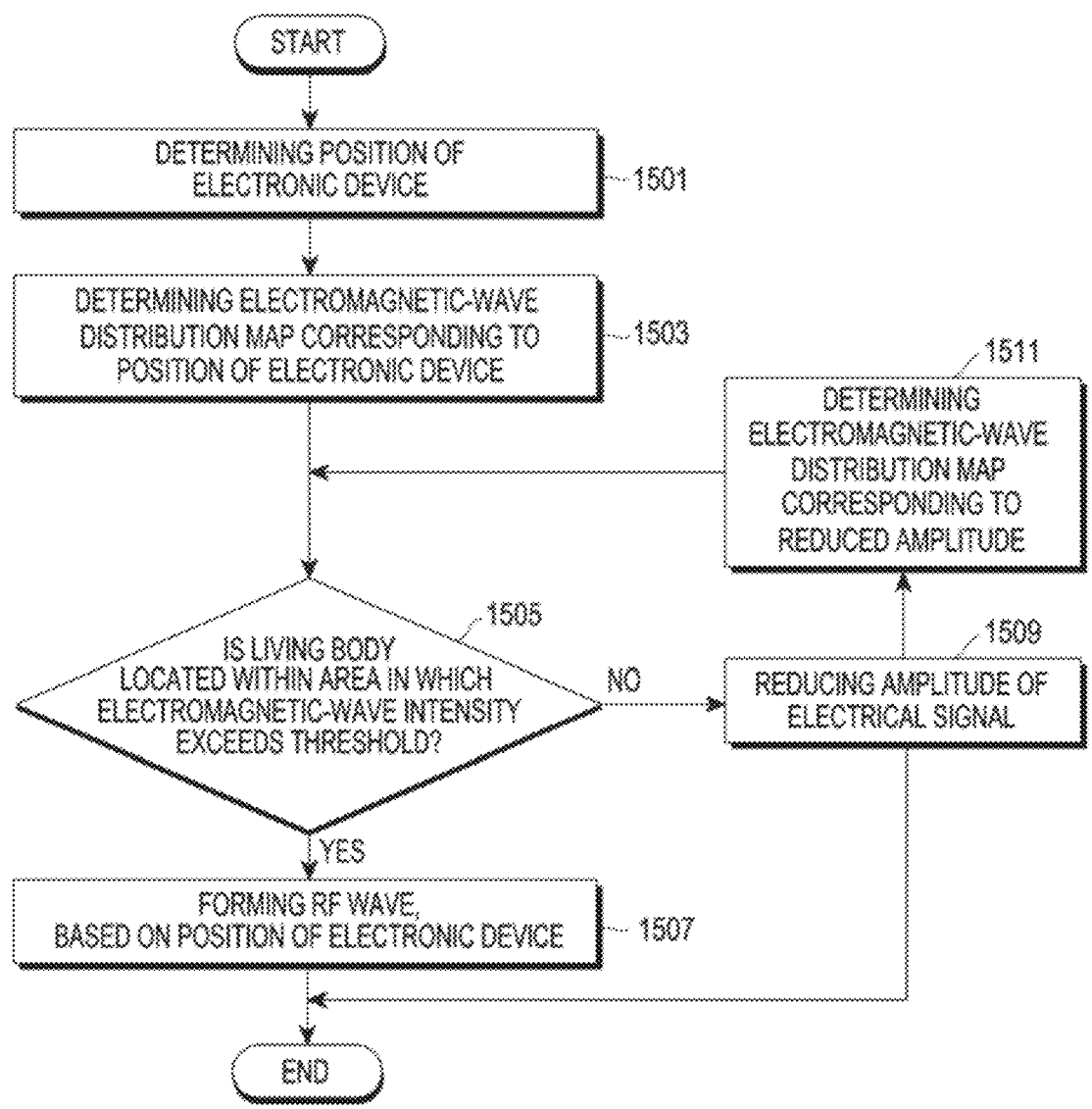
FIG. 15 is a flowchart illustrating a method of operating an electronic device according to various embodiments.
Figure 16A:
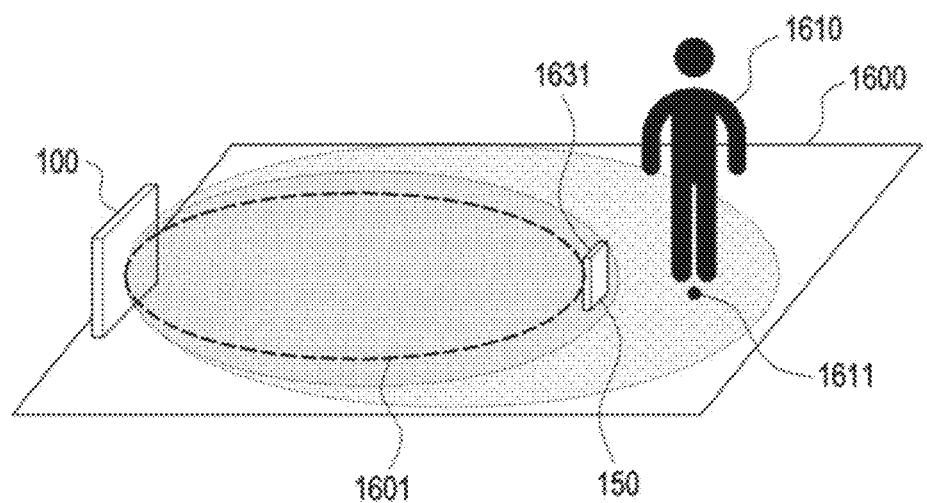
FIG. 16A is a diagram for describing thresholds of electromagnetic wave strengths according to various embodiments.
Figure 16B:
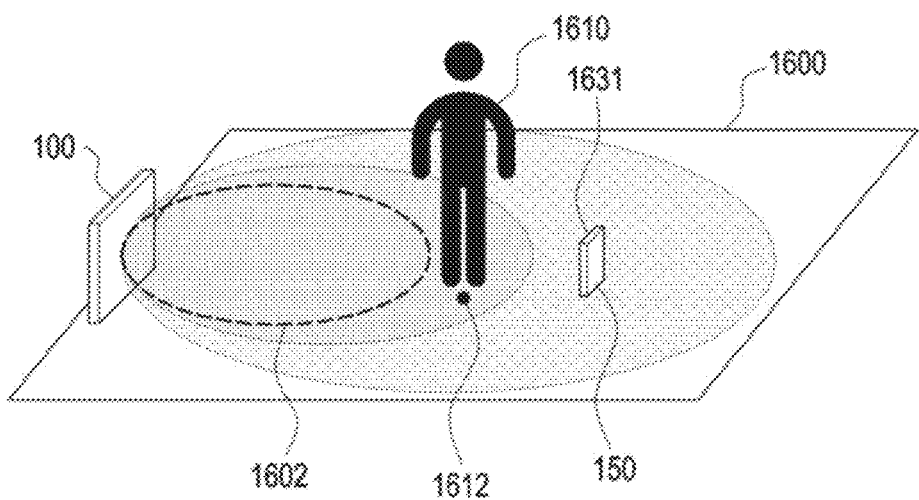
FIG. 16B is a diagram for describing thresholds of electromagnetic wave strengths according to various embodiments. 1351

FIG. 15 is a flowchart illustrating a method of operating an electronic device according to various embodiments. The embodiment of FIG. 15 will be described in more detail with reference to FIGS. 16A and 16B. FIGS. 16A and 16B are diagrams for describing thresholds of electromagnetic wave strengths according to various embodiments.

According to various embodiments, in operation 1501, the wireless power transmission apparatus 100 may determine the position of an electronic device. For example, as in FIG. 16A, the wireless power transmission apparatus 100 may determine that the electronic device 150 is located at a first set of coordinates 1631 in a space 1600. In operation 1503, the wireless power transmission apparatus 100 may determine an electromagnetic-wave distribution map corresponding to the position of the electronic device 150. The wireless power transmission apparatus 100 may determine an electromagnetic-wave distribution map corresponding to a transmission condition for forming an RF wave corresponding to a first set of coordinates 1631. In operation 1505, the wireless power transmission apparatus 100 may determine whether a living body is located in an area in which an electromagnetic-wave intensity exceeds a threshold. For example, the wireless power transmission apparatus 100 may identify a region 1601 corresponding to the threshold as in FIG. 16A, and may determine whether a living body 1610 is located in the area 1601. As in FIG. 16A, when it is determined that the position 1611 of the living body 1610 is outside the area 1601, in operation 1507, the wireless power transmission apparatus 100 may form an RF wave based on the position of the electronic device 150. As in FIG. 16A, when it is determined that the position 1612 of the living body 1610 is inside the area 1601, in operation 1509, the wireless power transmission apparatus 100 may reduce the amplitude of an electrical signal. In various embodiments, the reduction degree of the amplitude may be preset. In another embodiment, the wireless power transmission apparatus 100 may determine the reduction degree of the amplitude based at least on the distance between the position of the living body and the boundary line of the area 1601. For example, when the boundary of the area 1601 is relatively close, the wireless power transmission apparatus 100 may reduce the amplitude of the electrical signal to a relatively low degree. For example, when the boundary of the area 1601 is relatively far, the wireless power transmission apparatus 100 may reduce the amplitude of the electrical signal to a relatively high degree. In operation 1511, the wireless power transmission apparatus 100 may determine an electromagnetic-wave distribution map corresponding to the reduced amplitude. For example, the wireless power transmission apparatus 100 may determine an electromagnetic-wave distribution map as in FIG. 16B. In this case, the wireless power transmission apparatus 100 may identify that the area 1602 is relatively smaller in size than the area 1601 of FIG. 16A. This may be due to the relatively reduced magnitude of the amplitude of the RF wave. The wireless power transmission apparatus 100 may determine that a living body 1610 is located outside the area 1602 of the electromagnetic wave distribution map. Accordingly, the wireless power transmission apparatus 100 may perform charging with a corresponding amplitude. The wireless power transmission apparatus 100 may reduce the amplitude of an electrical signal to be input to the patch antennas until the living body 1610 is located outside the area set by the threshold.

The wireless power transmission apparatus 100 according to various embodiments may determine the movement of the living body. The wireless power transmission apparatus 100 may determine the new position of the living body by detecting the movement of the living body based on data from a sensor. The wireless power transmission apparatus 100 may determine whether the magnitude of the electromagnetic wave at the new position of the living body exceeds the threshold using the electromagnetic-wave distribution map corresponding to the current transmission conditions. When it is determined that the magnitude of the electromagnetic wave at the new position of the living body does not exceed the threshold, the wireless power transmission apparatus 100 may maintain the existing transmission conditions. When it is determined that the magnitude of the electromagnetic wave at the new position of the living body exceeds the threshold, the wireless power transmission apparatus 100 may change the transmission conditions. The wireless power transmission apparatus 100 may reduce the magnitude of an electrical signal input to the patch antennas, or may adjust the phase of the electrical signal.

Figure 17:
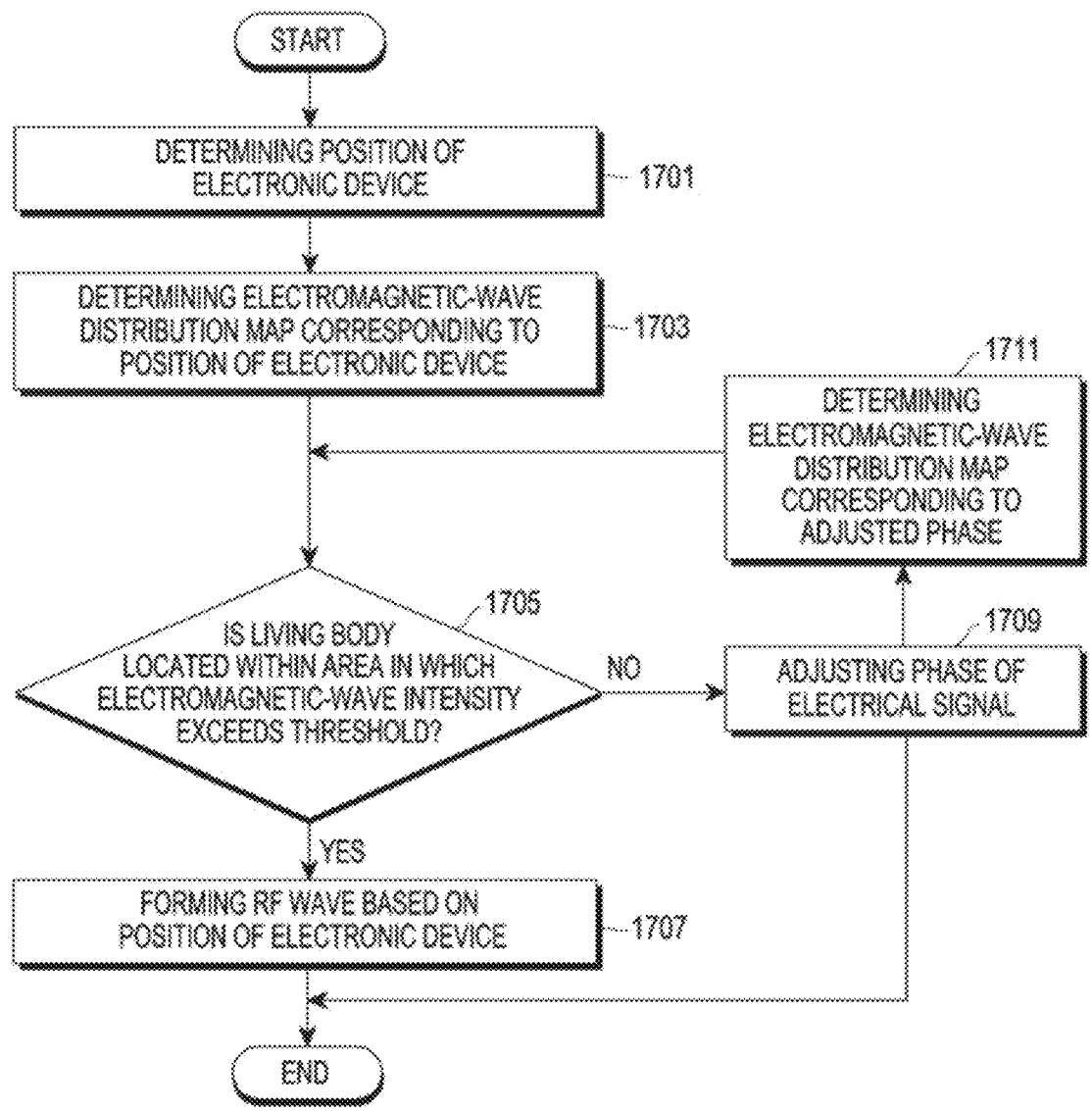
FIG. 17 is a flowchart for describing a method of operating an electronic device according to various embodiments.
Figure 18:
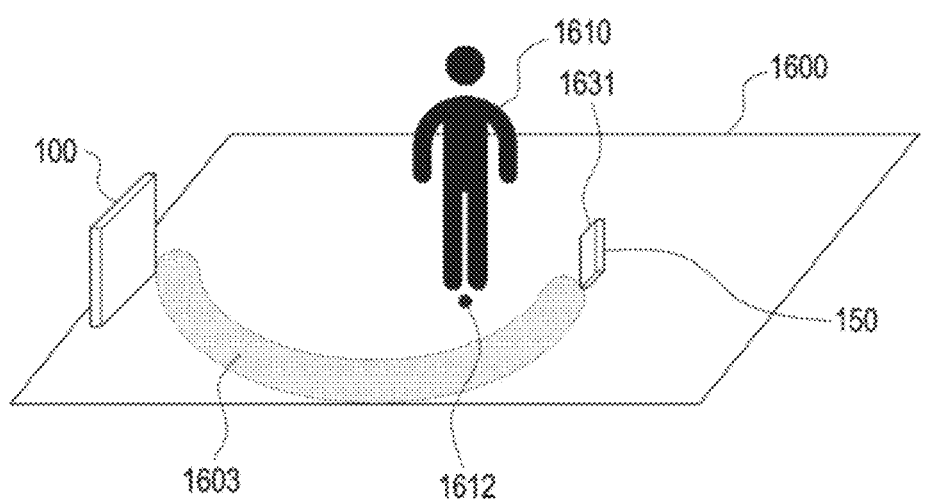
FIG. 18 is a diagram for describing a threshold of electromagnetic-wave intensity according to various embodiments.

FIG. 17 is a flowchart for describing a method of operating an electronic device according to various embodiments. The embodiment of FIG. 17 will be described in more detail with reference to FIG. 18. FIG. 18 is a diagram for describing thresholds of electromagnetic-wave intensity according to various embodiments.

According to various embodiments, in operation 1701, the wireless power transmission apparatus 100 may determine the position of an electronic device. For example, as in FIG. 16A, the wireless power transmission apparatus 100 may determine that the electronic device 150 is located at a first set of coordinates 1631 in a space 1600. In operation 1703, the wireless power transmission apparatus 100 may determine an electromagnetic-wave distribution map corresponding to the position of the electronic device 150. The wireless power transmission apparatus 100 may determine an electromagnetic-wave distribution map corresponding to a transmission condition for forming an RF wave corresponding to a first set of coordinates 1631. In operation 1705, the wireless power transmission apparatus 100 may determine whether a living body is located in an area in which an electromagnetic-wave intensity exceeds a threshold. When it is determined that the position 1611 of the living body 1610 is outside the area 1601, in operation 1707, the wireless power transmission apparatus 100 may form an RF wave based on the position of the electronic device 150. Alternatively, when it is determined that the position 1612 of the living body 1610 is inside the area 1601, in operation 1709, the wireless power transmission apparatus 100 may adjust the phase of the electrical signal as in FIG. 18. In operation 1711, the wireless power transmission apparatus 100 may determine an electromagnetic-wave distribution map corresponding to the adjusted amplitude. As in FIG. 18, if it is determined that the living body 1610 is outside an area 1603 having a size less than or equal to the threshold of a newly selected electromagnetic-wave distribution map, the wireless power transmission apparatus 100 may form an RF wave under the corresponding transmission conditions.

Figure 19A:
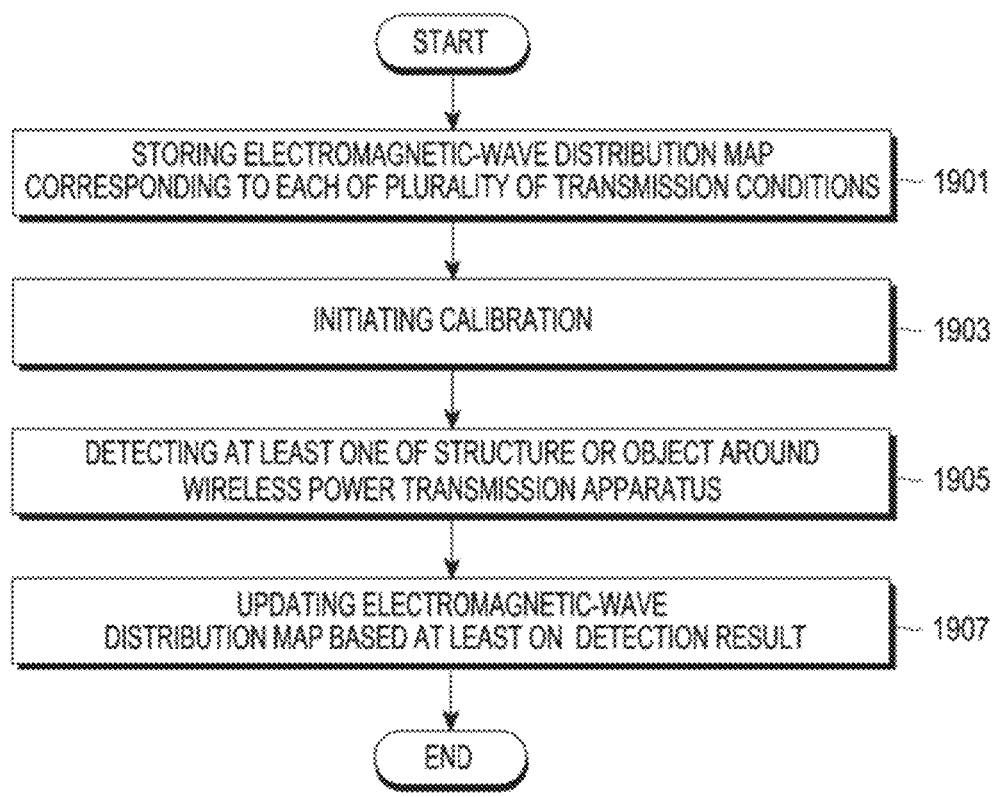
FIG. 19A is a flowchart for describing a method of operating a wireless power transmission apparatus according to various embodiments.
Figure 19B:
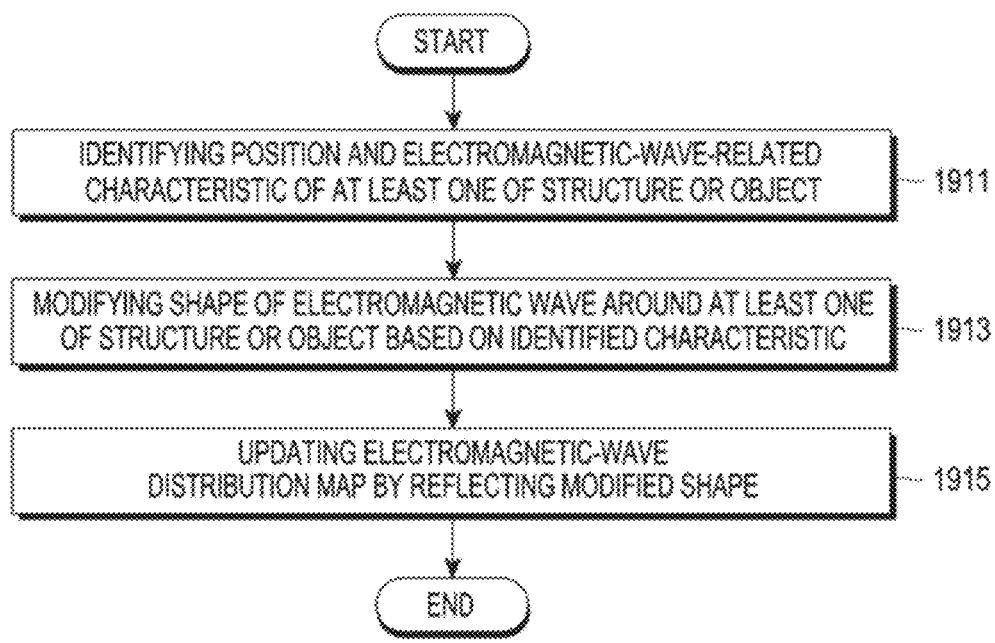
FIG. 19B is a flowchart for describing a method of operating a wireless power transmission apparatus according to various embodiments.
Figure 19C:
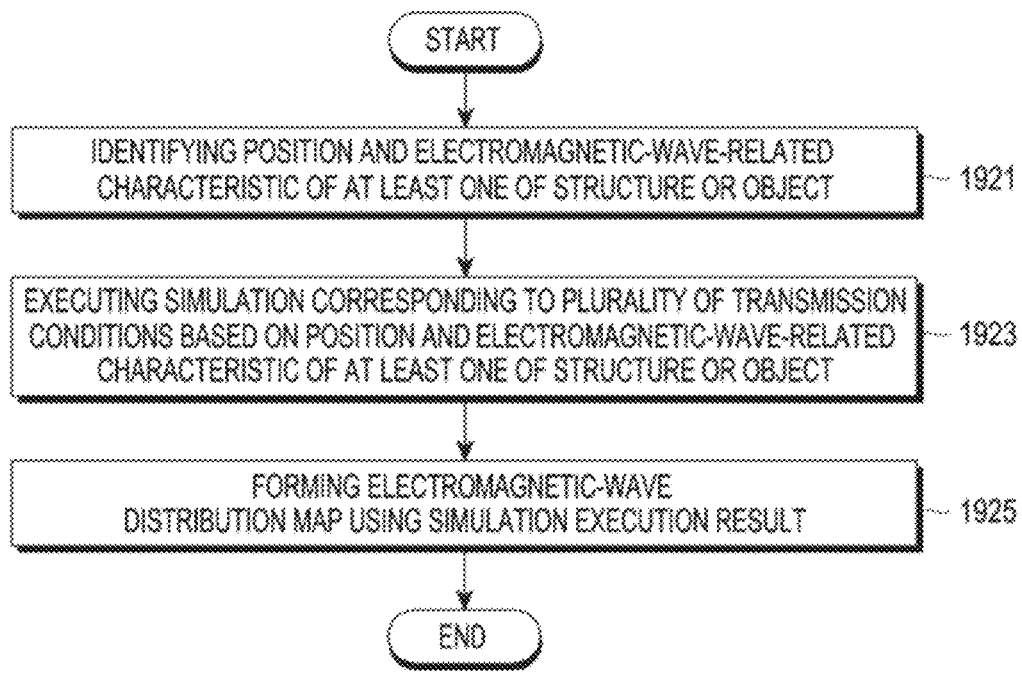
FIG. 19C is a flowchart for describing a method of operating a wireless power transmission apparatus according to various embodiments.

FIGS. 19A to 19C are flowcharts for describing a method of operating a wireless power transmission apparatus according to various embodiments.

According to various embodiments, in operation 1901, the wireless power transmission apparatus 100 may store an electromagnetic-wave distribution map corresponding to each of a plurality of transmission conditions. For example, the electromagnetic-wave distribution map may be formed by simulation results using a plurality of transmission conditions or by measuring the intensities of electromagnetic waves at a plurality of points in the space in the case in which RF waves are formed under the plurality of transmission conditions. The wireless power transmission apparatus 100 may receive an electromagnetic-wave distribution map corresponding to each of a plurality of transmission conditions from another electronic device and store the electromagnetic-wave distribution map, or may directly form the electromagnetic-wave distribution map. The electromagnetic-wave distribution map corresponding to each of the plurality of transmission conditions may be formed, for example, when there is no object or structure in a space. Accordingly, the electromagnetic-wave distribution in the environment in which the wireless power transmission apparatus 100 is actually placed may be different from that in the stored electromagnetic-wave distribution map.

In operation 1903, the wireless power transmission apparatus 100 may initiate calibration. In operation 1905, the wireless power transmission apparatus 100 may detect at least one of a structure or an object therearound. For example, the wireless power transmission apparatus 100 may determine the position of at least one of a structure or an object with respect to the wireless power transmission apparatus 100 based thereon using a sensor capable of detecting an object therearound (e.g., a radar, a camera, or an ultrasonic sensor). In operation 1907, the wireless power transmission apparatus 100 may update the electromagnetic-wave distribution map based at least on a detection result. For example, the wireless power transmission apparatus 100 may process electromagnetic waves to be reflected in a portion in which a structure is present in the electromagnetic distribution map. The wireless power transmission apparatus 100 may process electromagnetic waves to be reflected or absorbed in a portion in which an object is present in the electromagnetic distribution map. The wireless power transmission apparatus 100 may perform a process corresponding to a structure or an object in each of a plurality of electromagnetic-wave distribution maps. Accordingly, the wireless power transmission apparatus 100 may store an electromagnetic-wave distribution map in which the actual environment is reflected. Subsequently, the wireless power transmission apparatus 100 may determine whether to change or maintain the transmission conditions depending on whether a person is located in an area exceeding a threshold of the updated electromagnetic-wave distribution map after determining the transmission conditions.

Referring to FIG. 19B, according to various embodiments, in operation 1911, the wireless power transmission apparatus 100 may identify the position and the electromagnetic-wave-related characteristics (e.g., reflectance, absorbance, conductivity, or dielectric constant) of at least one of a structure or an object. The wireless power transmission apparatus 100 may identify the position and the electromagnetic-wave-related characteristics of at least one of a structure or an object based at least on information obtained through a sensor. For example, the wireless power transmission apparatus 100 may identify an electromagnetic-wave-related characteristic of at least one of a structure or an object based at least on the characteristics of reflected waves. For example, the wireless power transmission apparatus 100 may segment an object from a captured image, and may identify the segmented object. The wireless power transmission apparatus 100 may identify an electromagnetic-wave-related characteristic of at least one of a structure or an object based at least on an identification result. For example, the wireless power transmission apparatus 100 may store, in advance, associated information between the identification result and the electromagnetic-wave-related characteristic. For example, when the detected object is made of metal, the wireless power transmission apparatus 100 may identify a corresponding reflectance. In operation 1913, the wireless power transmission apparatus 100 may modify the shape of an electromagnetic wave around at least one of a structure or an object, based at least on the identified characteristics. In operation 1915, the wireless power transmission apparatus 100 may update the electromagnetic-wave distribution map by reflecting the modified shape. The wireless power transmission apparatus 100 may update the electromagnetic-wave distribution map periodically or aperiodically. For example, the wireless power transmission apparatus 100 may update the electromagnetic-wave distribution map when a change in an object or a structure therearound is detected or when the position or orientation of the wireless power transmission apparatus 100 is changed.

Referring to FIG. 19C, in operation 1921, the wireless power transmission apparatus 100 may identify the position and the electromagnetic-wave-related characteristic of at least one of a structure or an object. As described above, the wireless power transmission apparatus 100 may determine at least one of the position or the electromagnetic-wave-related characteristic of an object or a structure therearound based at least on information obtained through various sensors. In operation 1923, the wireless power transmission apparatus 100 may execute a simulation corresponding to a plurality of transmission conditions based on the position and the electromagnetic-wave-related characteristics of at least one of a structure or an object. For example, when the wireless power transmission apparatus 100 forms an RF wave under a first transmission condition (e.g., at least one of phase adjustment degree or amplitude information of an electrical signal input to each of the plurality of patch antennas), the wireless power transmission apparatus 100 may perform a simulation such that the corresponding electromagnetic wave is reflected or absorbed by an object or a structure therearound. In operation 1925, the wireless power transmission apparatus 100 may form an electromagnetic-wave distribution map using a simulation execution result. Alternatively, the wireless power transmission apparatus 100 may transmit at least one of the position or the electromagnetic-wave-related characteristic of an object or a structure therearound to another electronic device (e.g., a server) capable of performing a simulation. The another electronic device may simulate RF wave formation for each of various transmission conditions using the received information on the environment around the wireless power transmission apparatus 100. Accordingly, the another electronic device may form electromagnetic-wave distribution maps for various transmission conditions of the wireless power transmission apparatus 100. The another electronic device may transmit the electromagnetic-wave distribution maps to the wireless power transmission apparatus 100. The wireless power transmission apparatus 100 may store the received electromagnetic-wave distribution maps, and may later determine whether a living body is present in an area exceeding a threshold before forming an RF wave. The wireless power transmission apparatus 100 may update the electromagnetic-wave distribution map periodically or aperiodically. For example, the wireless power transmission apparatus 100 may update the electromagnetic-wave distribution map when a change of an object or a structure therearound is detected, or when the position or orientation of the wireless power transmission apparatus 100 is changed.

Figure 20A:
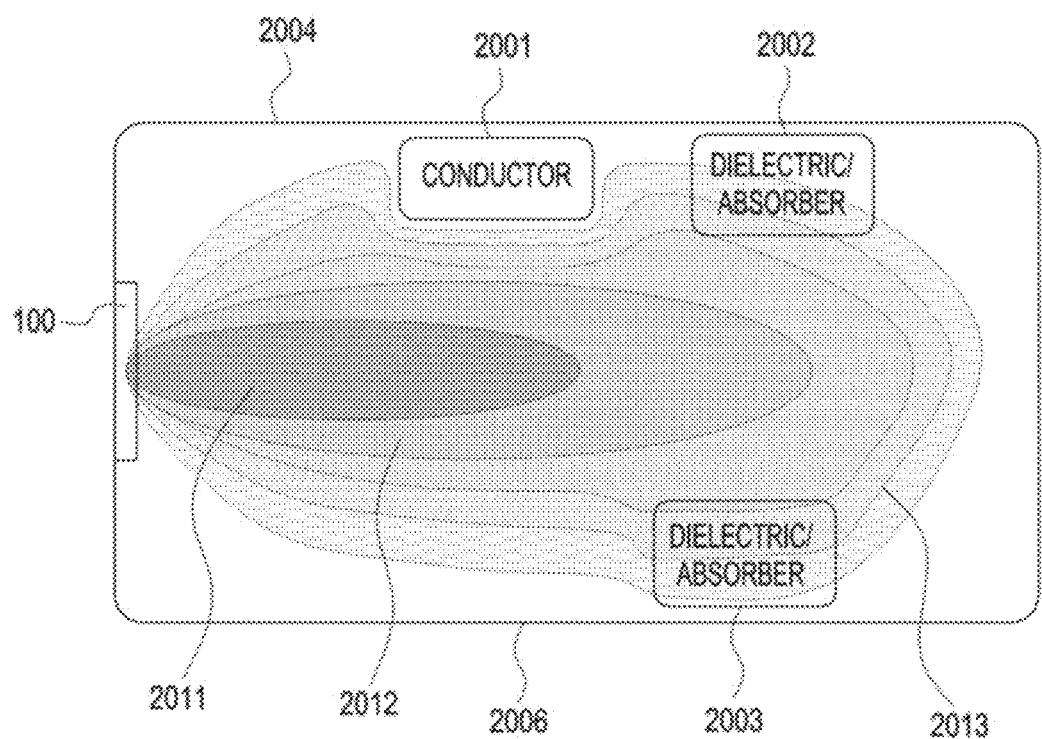
FIG. 20A is a diagram for describing update of an electromagnetic distribution map according to various embodiments.
Figure 20B:
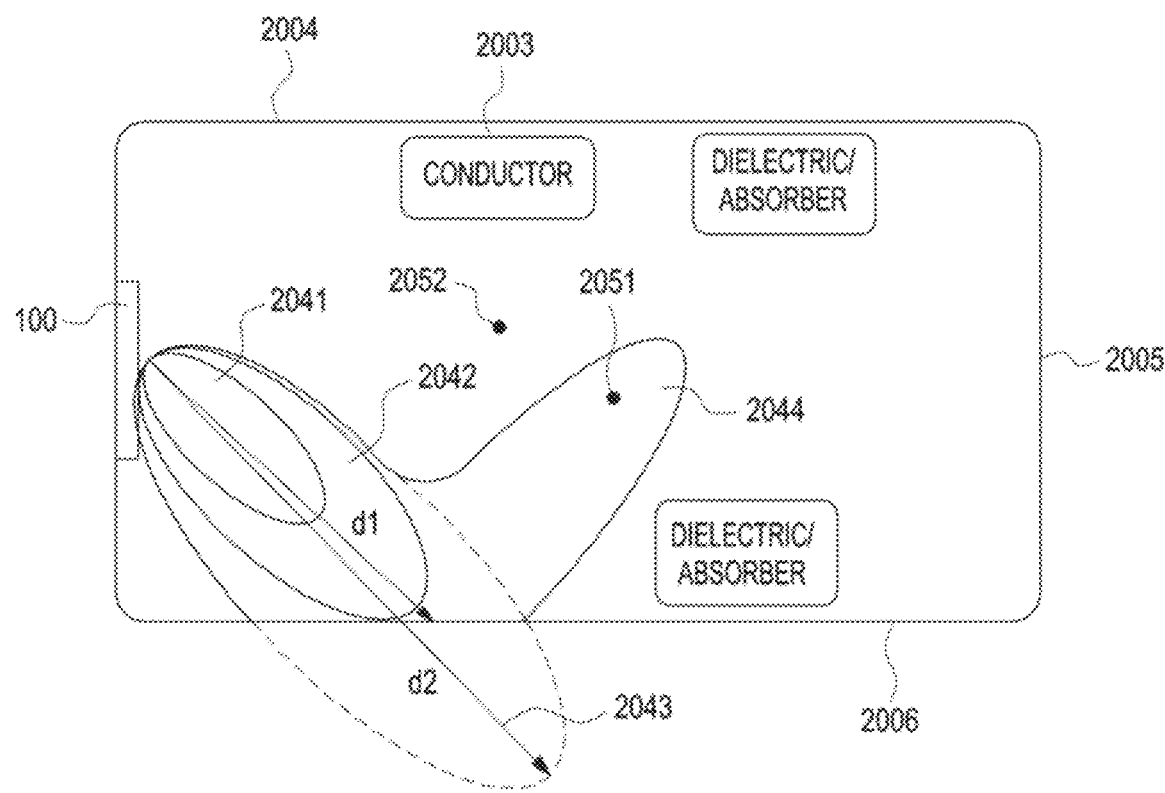
FIG. 20B is a diagram for describing update of an electromagnetic distribution map according to various embodiments.

FIGS. 20A and 20B are diagrams for describing update of an electromagnetic distribution map according to various embodiments.

Referring to FIG. 20A, the wireless power transmission apparatus 100 according to various embodiments may determine the positions of objects 2001, 2002, and 2003 and structures 2004, 2005, and 2006 therearound. The wireless power transmission apparatus 100 may determine that the electromagnetic-wave-related characteristic of the object 2001 is the characteristic of a conductor, and that the respective electromagnetic-wave-related characteristics of the object 2002 and the object 2003 are the characteristics of a dielectric and an absorber. The wireless power transmission apparatus 100 may store an electromagnetic-wave distribution map in which a first magnitude area 2011, a second magnitude area 2012, and a third magnitude area 2013 of electromagnetic waves have a shape similar to an ellipse. The wireless power transmission apparatus 100 may update the electromagnetic-wave distribution map such that electromagnetic waves are reflected by, for example, an object 2001.

Referring to FIG. 20B, the wireless power transmission apparatus 100 may form an electromagnetic-wave distribution map under a transmission condition for forming an RF wave in a direction different from the direction in FIG. 20A. If there is no structure 2006, the wireless power transmission apparatus 100 may reflect the second magnitude area 2042 surrounding the first magnitude area 2041 to the electromagnetic-wave distribution map, and may reflect the third magnitude area 2043 surrounding the second magnitude area 2042 to the electromagnetic-wave distribution map. The third magnitude area 2043 may be formed by, for example, a distance d2 with reference to the wireless power transmission apparatus 100. However, the distance between the wireless power transmission apparatus 100 and the structure 2006 may be d1, and thus the third magnitude area 2043 may not be formed over the distance of d2. The wireless power transmission apparatus 100 may reflect the third magnitude area 2044 to the electromagnetic-wave distribution map in the form in which electromagnetic waves are reflected by the structure 2006. Accordingly, the wireless power transmission apparatus 100 may store an electromagnetic-wave distribution map in which the actual environment is reflected. For example, it is assumed that an electronic device 150 is located at a first position 2051 and that a person is located at a second position 2052 between the first position 2051 and the wireless power transmission apparatus 100. In this case, if the wireless power transmission apparatus 100 forms an RF wave to be directly oriented toward the first position 2051, the magnitude of the RF wave may be reduced by the person, and the RF wave may be applied to the person. The wireless power transmission apparatus 100 may form RF waves like the electromagnetic-wave distribution map of FIG. 20B, and thus power transmission through a bypass path may be enabled.

Since the wireless power transmission apparatus 100 determines that the structure 2006 reflects electromagnetic waves, the wireless power transmission apparatus 100 may generate an electromagnetic-wave distribution map as in FIG. 20B. If it is determined that the structure 2006 has a characteristic of absorbing electromagnetic waves, the wireless power transmission apparatus 100 may generate an electromagnetic-wave distribution map in which electromagnetic waves are not reflected but are absorbed by the structure 2006.

Figure 21:
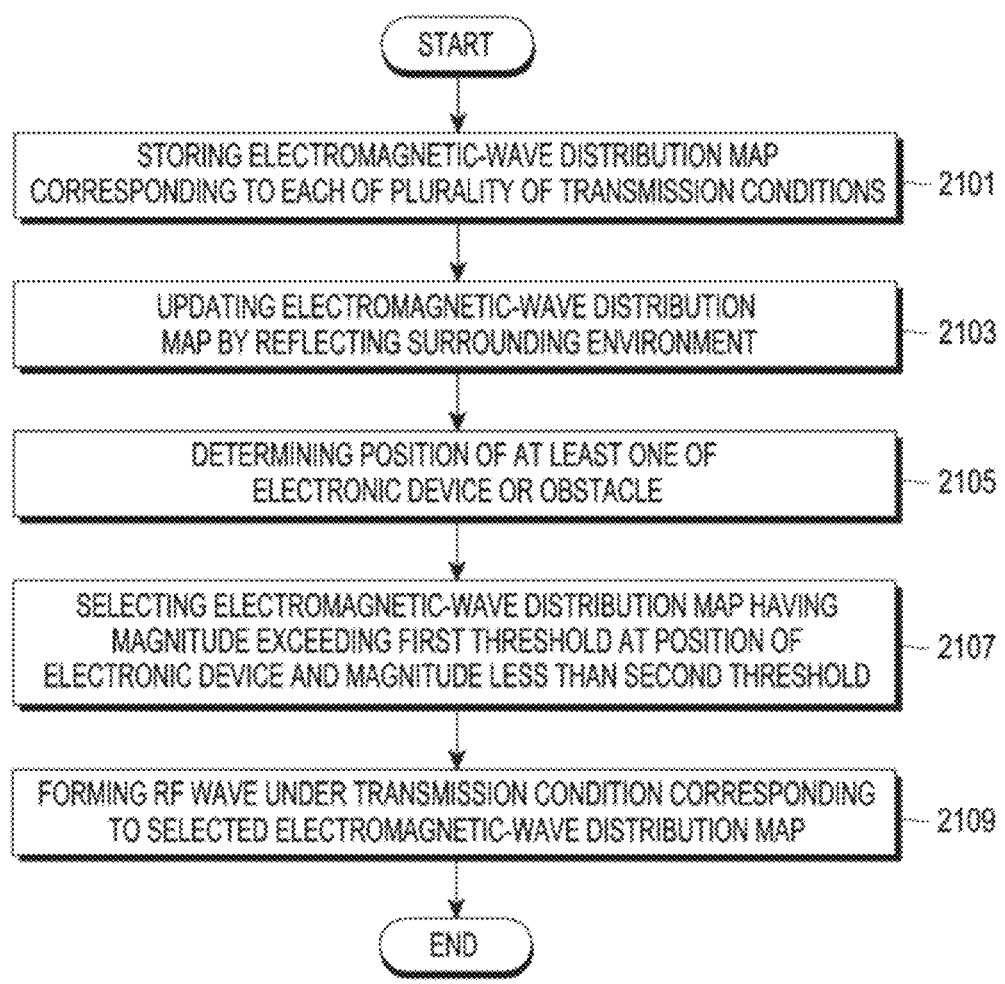
FIG. 21 is a flowchart for describing a method of operating an electronic device according to various embodiments.
Figure 22:
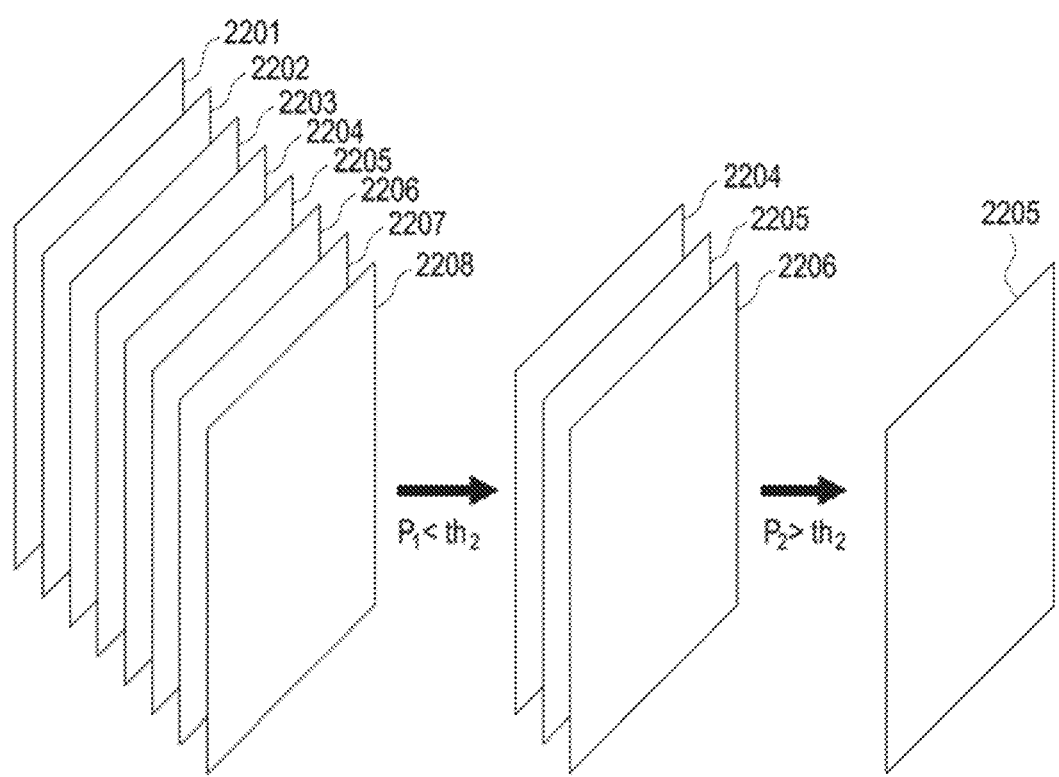
FIG. 22 is a view for describing a process of selecting an electromagnetic distribution map according to various embodiments.

FIG. 21 is a flowchart for describing a method of operating an electronic device according to various embodiments. The embodiment of FIG. 21 will be described in more detail with reference to FIG. 22. FIG. 22 is a view for describing a process of selecting an electromagnetic distribution map according to various embodiments.

According to various embodiments, in operation 2101, the wireless power transmission apparatus 100 may store an electromagnetic-wave distribution map corresponding to each of a plurality of transmission conditions. In operation 2103, the wireless power transmission apparatus 100 may update the electromagnetic-wave distribution map by reflecting the surrounding environment. For example, as described above with reference to FIGS. 19A to 19C, the wireless power transmission apparatus 100 may update an electromagnetic-wave distribution map corresponding to each of a plurality of transmission conditions based on at least one of a position or an electromagnetic-wave-related characteristic of at least one of an object or a structure therearound. For example, as in FIG. 22, the wireless power transmission apparatus 100 may store a plurality of electromagnetic-wave distribution maps 2201, 2202, 2203, 2204, 2205, 2206, 2207, and 2208, updated based on the surrounding environment. Each of the electromagnetic-wave distribution maps 2201, 2202, 2203, 2204, 2205, 2206, 2207, and 2208 may include, for example, information on the magnitude of electromagnetic waves for each position (or each set of coordinates) at the time of RF wave formation under each of a plurality of transmission conditions.

In operation 2105, the wireless power transmission apparatus 100 may determine the position of at least one of an electronic device or an obstacle. For example, the wireless power transmission apparatus 100 may detect at least an electronic device or an obstacle that enters the surrounding space. The wireless power transmission apparatus 100 may determine whether or not the detected object is an electronic device to be charged according to various schemes described above. Alternatively, the wireless power transmission apparatus 100 may determine whether or not the detected object is a living body according to various schemes described above.

In operation 2107, the wireless power transmission apparatus 100 may search for an electromagnetic distribution map in which electromagnet waves have a magnitude exceeding a first threshold at the position of an electronic device and have a magnitude smaller than a second threshold at the location of a living body. For example, the wireless power transmission apparatus 100 may determine that the coordinates of the electronic device to be charged are (a1, b1, c1), and that the coordinates of the living body are (a2, b2, c2). The above-described coordinates may be expressed as a range rather than as single values. The wireless power transmission apparatus 100 may select an electromagnetic-wave distribution map in which the magnitude of electromagnetic waves at (a1, b1, c1) exceeds the first threshold and the magnitude of the electromagnetic waves at (a2, b2, c2) is less than the second threshold. For example, as in FIG. 22, the wireless power transmission apparatus 100 may select an electromagnetic-wave distribution map 2204, 2205, or 2206 in which the electromagnetic-wave intensity $P_1$ at (a2, b2, c2), which are the coordinates of a living body, is less than a second threshold $th_2$, among a plurality of electromagnetic-wave distribution maps 2201, 2202, 2203, 2204, 2205, 2206, 2207, and 2208. The wireless power transmission apparatus 100 may select an electromagnetic-wave distribution map 2205 in which the electromagnetic-wave intensity $P_2$ at (a1, b1, c1), which are the coordinates of an electronic device to be charged, exceeds the first threshold $th_1$. If there are a plurality of electromagnetic-wave distribution maps satisfying both conditions, the wireless power transmission apparatus 100 may select an electromagnetic distribution map in which the electromagnetic-wave intensity $P_2$ at (a1, b1, c1), which are the coordinates of the electronic device to be charged, is the largest. If there is no electromagnetic-wave distribution map in which the electromagnetic-wave intensity $P_2$ at (a1, b1, c1), which are the coordinates of an electronic device to be charged, exceeds the first threshold $th_1$, the wireless power transmission apparatus 100 may select an electromagnetic-wave distribution map in which the electromagnetic-wave intensity $P_2$ at (a1, b1, c1), which are the coordinates of an electronic device to be charged, is the largest, among the electromagnetic-wave distribution maps in which the electromagnetic-wave intensity P1 at (a2, b2, c2), which are the coordinates of a living body, is less than the second threshold $th_2$. If them is no electromagnetic-wave distribution map in which the electromagnetic-wave intensity $P_1$ at (a2, b2, c2), which are the coordinates of the living body, is less than the second threshold $th_2$, the wireless power transmission apparatus 100 may output a message making a request to change at least one of the position of a person or the position of an electronic device without starting charging. In 2109, the wireless power transmission apparatus 100 may form an RF wave under a transmission condition corresponding to the selected electromagnetic-wave distribution map.

Figure 23A:
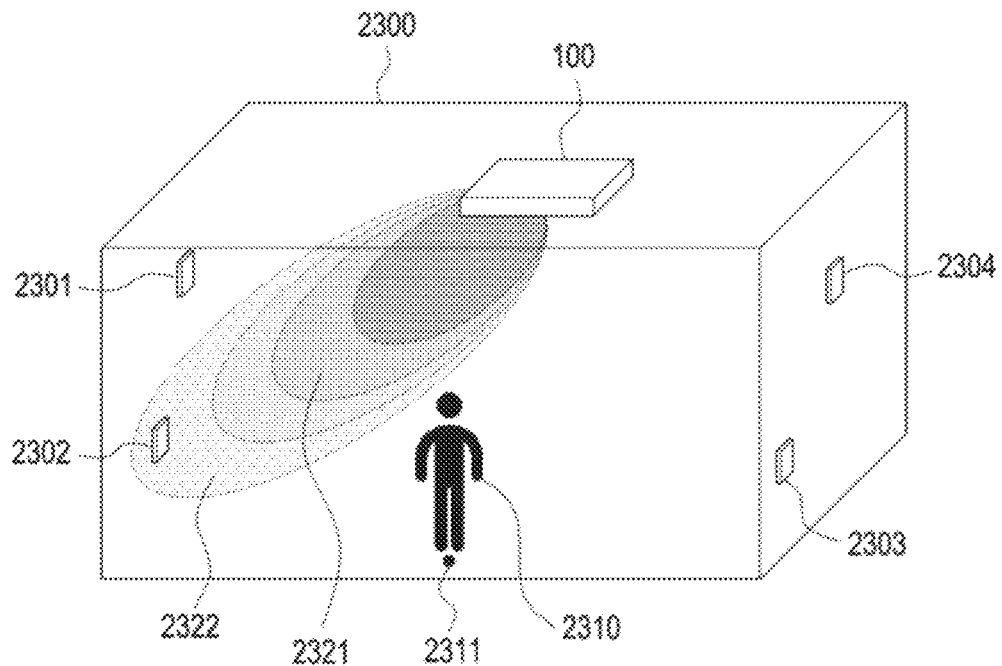
FIG. 23A illustrates a charging environment according to various embodiments.
Figure 23B:
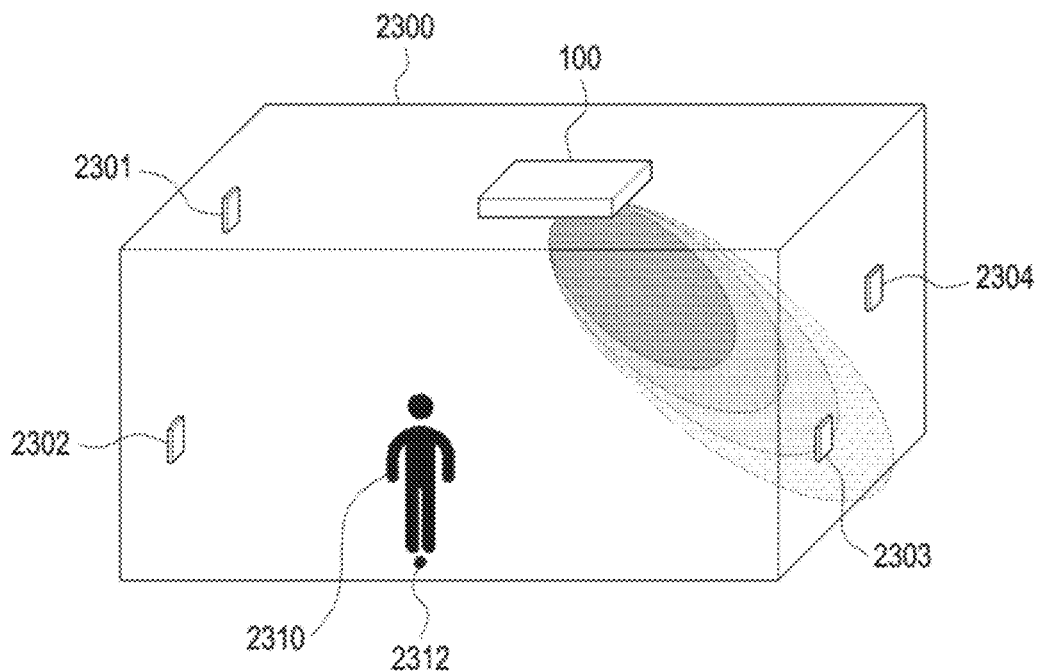
FIG. 23B illustrates a charging environment according to various embodiments.

FIGS. 23A and 23B illustrate charging environments according to various embodiments.

Referring to FIG. 23A, the wireless power transmission apparatus 100 may be located at a point (e.g., a ceiling) of an indoor environment 2300. The wireless power transmission apparatus 100 may be installed, for example, within an access point (AP) provided at a fixed position, or may be installed together with an AP. One or more sensors 2301, 2032, 2033, and 2034 may be disposed in the indoor environment 2300. Each of the one or more sensors 2301, 2032, 2033, and 2034 may sense, for example, temperature, humidity, illuminance, air pollution, harmful gases, or movement. Alternatively, each of the one or more sensors 2301, 2032, 2033, and 2034 may sense the movement of various electronic devices or possessions as well as the surrounding environment. The one or more sensors 2301, 2032, 2033, and 2034 may consume power for sensing and data transmission and reception. Accordingly, the one or more sensors 2301, 2032, 2033, and 2034 may wirelessly receive power and may use the same for operation. The wireless power transmission apparatus 100 may measure the position 2311 of the user 2310 in the indoor environment 2300. The wireless power transmission apparatus 100 may form RF waves 2321 toward some sensors 2301 and 2302 among the plurality of sensors 2301, 2302, 2303, and 2304 such that RF waves having a magnitude exceeding a threshold are not applied to the user 2310. In addition, when the user 2310 moves to another position 2312 as in FIG. 23B, the wireless power transmission apparatus 100 may form RF waves 2321 toward some sensors 2303 and 2304 among the plurality of sensors 2301, 2302, 2303, and 2304 such that RF waves having a magnitude exceeding a threshold are not applied to the user 2310. That is, when it is necessary to perform charging with respect to a plurality of electronic devices, the wireless power transmission apparatus 100 may form RF waves toward some electronic devices such that RF waves having a magnitude exceeding a threshold are not applied to the living body.

Figure 24:
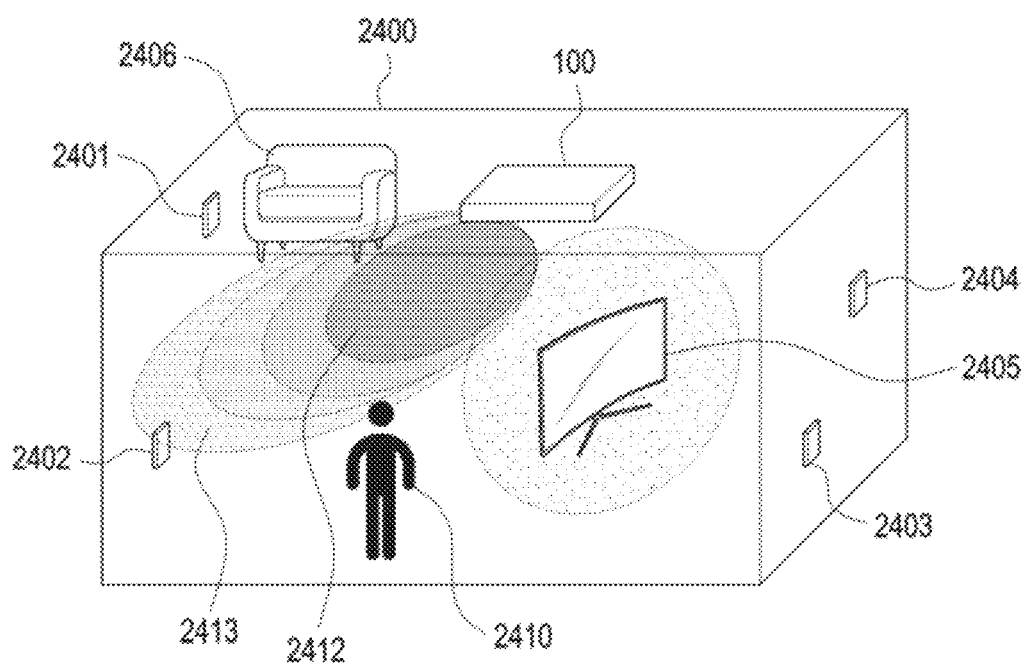
FIG. 24 illustrates a charging environment according to various embodiments.
Figure 25:
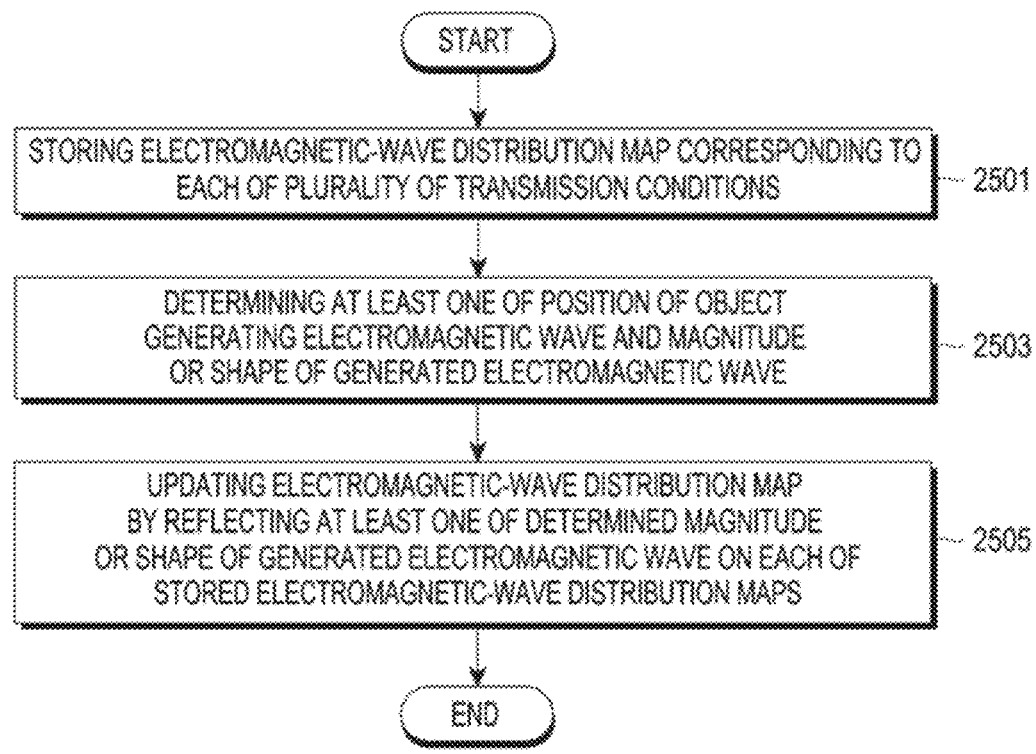
FIG. 25 is a flowchart illustrating a method of operating a wireless power transmission apparatus according to various embodiments.

FIG. 24 illustrates a charging environment according to various embodiments. The embodiment of FIG. 24 will be described in more detail with reference to FIG. 25. FIG. 25 is a flowchart illustrating a method of operating a wireless power transmission apparatus according to various embodiments.

Referring to FIG. 24, the wireless power transmission apparatus 100 may be located at a point (e.g., ceiling) in an indoor environment 2400. In the indoor environment 2400, one or more sensors 2401, 2402, 2403, and 2404, a TV 2405 that generates electromagnetic waves, and a sofa 2406 that absorbs electromagnetic waves may be disposed. Referring to FIG. 25, in operation 2501, the wireless power transmission apparatus 100 may store an electromagnetic-wave distribution map corresponding to each of a plurality of transmission conditions. In operation 2503, the wireless power transmission apparatus 100 may determine at least one of the position of an object that generates electromagnetic waves and the magnitude or shape of the generated electromagnetic waves. For example, the wireless power transmission apparatus 100 may determine at least one of the position of an object that generates electromagnetic waves 1411, such as TV 2405 in FIG. 24, and the magnitude or shape of electromagnetic waves generated from the TV 2405. In various embodiments, the wireless power transmission apparatus 100 may directly receive electromagnetic waves generated from an object, and may determine at least one of the magnitude or shape of the electromagnetic waves by analyzing the received electromagnetic waves. Alternatively, the wireless power transmission apparatus 100 may determine at least one of the magnitude or shape of the electromagnetic waves stored in correspondence with the identification information of an object identified through communication or image processing. In operation 2505, the wireless power transmission apparatus 100 may update electromagnetic-wave distribution maps by reflecting at least one of the determined magnitude or shape of the electromagnetic waves on each of the stored electromagnetic-wave distribution maps. The wireless power transmission apparatus 100 may use an updated electromagnetic-wave distribution map when forming RF waves 2412 or 2413 later.

Figure 26:
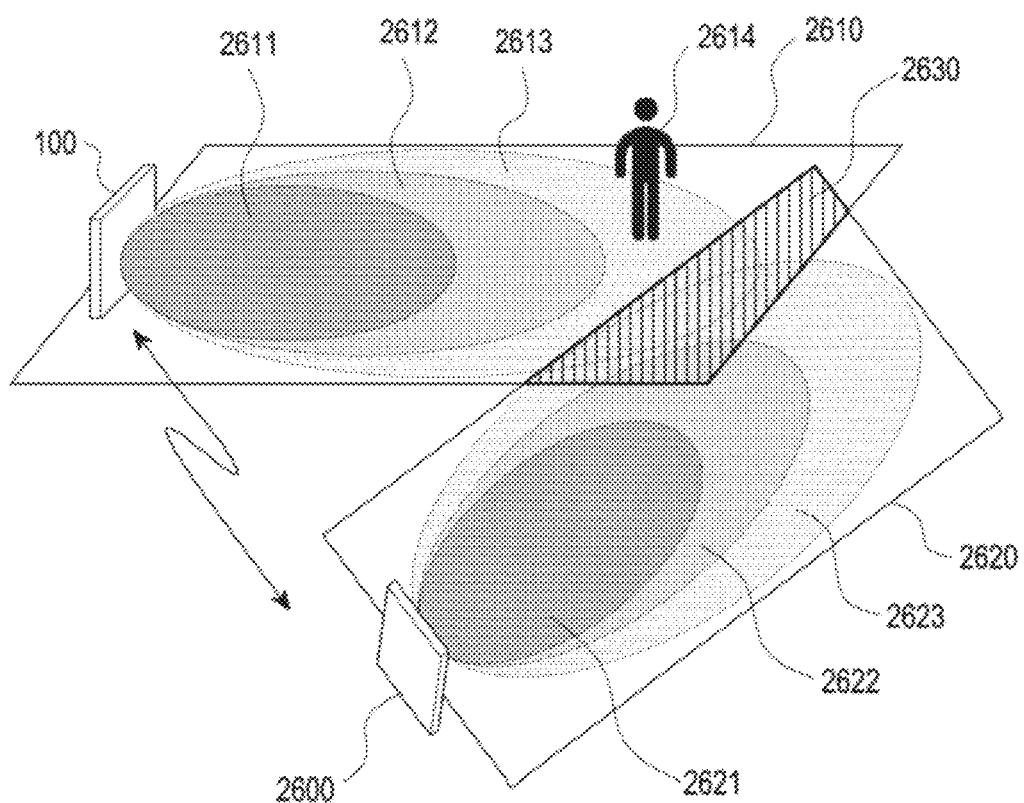
FIG. 26 is a diagram for describing an environment in which a plurality of wireless power transmission apparatuses is disposed.

FIG. 26 is a diagram for describing an environment in which a plurality of wireless power transmission apparatuses is disposed.

Referring to FIG. 26, the wireless power transmission apparatus 100 may store an electromagnetic-wave distribution map including a plurality of areas 2611, 2612, and 2613 corresponding to the case where RF waves are formed under a first condition with respect to an indoor environment 2610. Meanwhile, the wireless power transmission apparatus 2600 may store an electromagnetic-wave distribution map including a plurality of areas 2621, 2622, and 2623 corresponding to the case where RF waves are formed under a first condition with respect to an indoor environment 2620. The wireless power transmission apparatus 100 may receive an electromagnetic-wave distribution map from another wireless power transmission apparatus 2600. By reflecting the data of an area 2630 in which the indoor areas 2610 and 2620 overlap each other among the data of an electromagnetic-wave distribution map of the another wireless power transmission apparatus 2600 in an electromagnetic-wave distribution map for the indoor environment 2610, the wireless power transmission apparatus 100 may update the electromagnetic-wave distribution map. The wireless power transmission apparatus 100 may communicate with the another wireless power transmission apparatus 2600. The wireless power transmission apparatus 100 may identify at least one of the position or orientation of the another wireless power transmission apparatus 2600. The wireless power transmission apparatus 100 may select an area to be reflected in the electromagnetic-wave distribution map received from the another wireless power transmission apparatus 2600 based on at least one of the position or orientation of the another wireless power transmission apparatus 2600.

Various embodiments disclosed herein may be implemented by software (e.g., a program) including instructions stored in a machine-readable (e.g., computer-readable) storage medium (e.g., internal memory or external memory). The machine is an apparatus that is capable of calling stored instructions from a storage medium and capable of operating according to the called instructions, and may include a wireless power transmission apparatus (e.g., the wireless power transmission apparatus 100) according to the embodiments disclosed herein. The instruction, when executed by a processor (e.g., processor 320), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. A wireless power transmission apparatus comprising:
a plurality of patch antennas configured to form radio-frequency (RF) waves;
a memory configured to store a plurality of electromagnetic-wave distribution maps, which respectively correspond to a plurality of transmission conditions for transmitting the RF waves; and
a processor,
wherein the processor is configured to:
determine a position of an electronic device and a position of a living body;
determine a transmission condition for transmitting the RF waves, which causes an electromagnetic wave having a magnitude that does not exceed a first threshold to be applied to the position of the living body while being beam-formed at the position of the electronic device, using at least some of the plurality of electromagnetic-wave distribution maps; and
generate the RF waves under the determined transmission condition using the plurality of patch antennas,
wherein each of the plurality of electromagnetic-wave distribution maps includes a map representing magnitudes of an electromagnetic wave at a plurality of points around the wireless power transmission apparatus in a case in which the RF waves are formed according to each of the plurality of transmission conditions, and
wherein the processor is further configured to:
determine a transmission condition corresponding to the position of the electronic device among the plurality of transmission conditions as a transmission condition candidate,
select a first electromagnetic-wave distribution map corresponding to the transmission condition candidate among the plurality of electromagnetic-wave distribution maps,
determine whether a magnitude of an electromagnetic wave at coordinates on the first electromagnetic-wave distribution map exceeds the first threshold, the coordinates on the first electromagnetic-wave distribution map corresponding to the position of the living body, and
determine the transmission condition for transmitting the RF waves based on the determining of whether the magnitude of the electromagnetic wave at the coordinates on the first electromagnetic-wave distribution map exceeds the first threshold.

2. The wireless power transmission apparatus of claim 1, wherein the processor is further configured to:
determine the transmission condition candidate as the transmission condition for transmitting the RF waves when the magnitude of the electromagnetic wave at the coordinates on the first electromagnetic-wave distribution map does not exceed the first threshold.

3. The wireless power transmission apparatus of claim 1, wherein the processor is further configured to:
select, among the plurality of electromagnetic-wave distribution maps, a second electromagnetic-wave distribution map, which causes the magnitude of the electromagnetic wave at the position of the living body not to exceed the first threshold when the magnitude of the electromagnetic wave at the coordinates on the first electromagnetic-wave distribution map exceeds the first threshold; and
determine a transmission condition corresponding to the second electromagnetic-wave distribution map among the plurality of transmission conditions as the transmission condition for transmitting the RF waves.

4. The wireless power transmission apparatus of claim 1, wherein the processor is further configured to:
select, among the plurality of electromagnetic-wave distribution maps, a third electromagnetic-wave distribution map, which causes a magnitude of an electromagnetic wave at the position of the living body not to exceed the first threshold and causes a magnitude of an electromagnetic wave at the position of the electronic device to exceed a second threshold; and
determine a transmission condition corresponding to the third electromagnetic-wave distribution map among the plurality of transmission conditions as the transmission condition for transmitting the RF waves.

5. The wireless power transmission apparatus of claim 4, wherein the processor is further configured to:
select, among the plurality of electromagnetic-wave distribution maps, at least one electromagnetic-wave distribution map candidate in which the magnitude of the electromagnetic wave at the position of the living body does not exceed the first threshold;
select a fourth electromagnetic-wave distribution map in which the magnitude of the electromagnetic wave at the position of the electronic device is largest among at least one electromagnetic-wave distribution map in which the magnitude of the electromagnetic wave at the position of the electronic device exceeds the second threshold; and
determine a transmission condition corresponding to the fourth electromagnetic-wave distribution map among the plurality of transmission conditions as the transmission condition for transmitting the RF waves.

6. The wireless power transmission apparatus of claim 4, wherein the processor is further configured to:
select, among the plurality of electromagnetic-wave distribution maps, at least one electromagnetic-wave distribution map candidate in which the magnitude of the electromagnetic wave at the position of the living body does not exceed the first threshold;

select a fifth electromagnetic-wave distribution map in which the magnitude of the electromagnetic wave at the position of the electronic device is largest among the at least one electromagnetic-wave distribution map candidate; and determine a transmission condition corresponding to the fifth electromagnetic-wave distribution map among the plurality of transmission conditions as the transmission condition for transmitting the RF waves.

7. The wireless power transmission apparatus of claim 1, wherein the processor is further configured to:

determine at least one of a position or an electromagnetic-wave-related characteristic of at least one of an object or a structure in an environment in which the wireless power transmission apparatus is disposed; and update at least some of the plurality of electromagnetic-wave distribution maps based on the at least one of the position or the electromagnetic-wave-related characteristic of the at least one of the object or the structure.

8. The wireless power transmission apparatus of claim 7, wherein the processor is further configured to:

update the at least some of the plurality of electromagnetic-wave distribution maps by correcting an electromagnetic-wave distribution at a position of the at least one of the object or the structure of each of the plurality of electromagnetic-wave distribution maps to correspond to the electromagnetic-wave-related characteristic of the at least one of the object or the structure.

9. The wireless power transmission apparatus of claim 7, wherein the processor is further configured to:

update the at least some of the plurality of electromagnetic-wave distribution maps by performing an RF wave formation simulation for each of the plurality of transmission conditions using the at least one of the position or the electromagnetic-wave-related characteristic of the at least one of the object or the structure in the environment in which the wireless power transmission apparatus is disposed.

10. The wireless power transmission apparatus of claim 1, further comprising:

a communication circuit, wherein the processor is further configured to:

determine at least one of a position or an electromagnetic-wave-related characteristic of at least one of an object or a structure in an environment in which the wireless power transmission apparatus is disposed;

transmit the at least one of the position or the electromagnetic-wave-related characteristic of the at least one of the object or the structure to another electronic device through the communication circuit; and receive, through the communication circuit, a plurality of updated electronic wave distribution maps, which are generated by the another electronic device and are obtained as an RF wave formation simulation result for each of the plurality of transmission conditions by the wireless power transmission apparatus, in the environment in which the at least one of the object or the structure is disposed.

11. The wireless power transmission apparatus of claim 1, wherein the memory is configured to:

store associated information between spatial coordinates of subspaces obtained by dividing a surrounding space of the wireless power transmission apparatus into a predetermined number and transmission conditions for causing the RF waves to be beam-formed at the spatial coordinates.

12. The wireless power transmission apparatus of claim 11, wherein the transmission conditions in the associated information include at least one of a phase adjustment degree or amplitude information of an electrical signal input to each of the plurality of patch antennas.

13. The wireless power transmission apparatus of claim 11, wherein the processor is further configured to:

determine the transmission condition candidate corresponding to the position of the electronic device using the associated information.

14. The wireless power transmission apparatus of claim 13, wherein the processor is further configured to:

select a second electromagnetic-wave distribution map, which causes a magnitude of an electromagnetic wave at the position of the living body not to exceed the first threshold when a magnitude of an electromagnetic wave at the position of the living body in the first electromagnetic-wave distribution map exceeds the first threshold;

determine a transmission condition corresponding to the second electromagnetic-wave distribution map among the plurality of transmission conditions using the associated information; and determine the transmission condition corresponding to the second electromagnetic-wave distribution map as the transmission condition for transmitting the RF waves.

* * * * *